(12) United States Patent
Rodrigues et al.

(10) Patent No.: US 7,822,677 B1
(45) Date of Patent: Oct. 26, 2010

(54) ELECTRONIC PRICE-BASED INQUIRY LISTS FOR FINANCIAL PRODUCTS

(75) Inventors: Dennis Rodrigues, Redding, CT (US); Sumner White, Summit, NJ (US); Tanya Kanchanagom, Hoboken, NJ (US); Robert Allison, Jersey City, NJ (US); Rajesh Mani, Middlesex, NJ (US)

(73) Assignee: MarketAxess Holdings, Inc., New York, NY (US)

( * ) Notice: Subject to any disclaimer, the term of this patent is extended or adjusted under 35 U.S.C. 154(b) by 333 days.

(21) Appl. No.: 11/899,775

(22) Filed: Sep. 7, 2007

Related U.S. Application Data

(60) Provisional application No. 60/842,798, filed on Sep. 7, 2006.

(51) Int. Cl.
  *G06Q 40/00* (2006.01)
(52) U.S. Cl. .............................. 705/37; 705/35; 717/106
(58) Field of Classification Search .................. 717/106; 705/35–38; 380/28
  See application file for complete search history.

(56) References Cited

U.S. PATENT DOCUMENTS

2002/0091991 A1* 7/2002 Castro ........................ 717/106
2002/0095369 A1* 7/2002 Kaplan et al. .................. 705/37
2003/0187768 A1* 10/2003 Ryan et al. ..................... 705/35

* cited by examiner

*Primary Examiner*—James P Trammell
*Assistant Examiner*—Marissa Liu
(74) *Attorney, Agent, or Firm*—Proskauer Rose LLP

(57) ABSTRACT

Price-based inquiry lists for financial interests are submitted, negotiated and traded between investors and dealers over a network or networks. An investor interface for display is provided to an investor. A dealer interface for display is provided to a plurality of dealers. The investor can create a price-based inquiry list via the investor interface containing a plurality of inquiries for a corresponding plurality of different financial interests and can transmit the price-based inquiry list to one or more selected dealers, where an established relationship exists between the investor and the dealers. One or more of the selected dealers may provide responses to the received price-based inquiry list, where the response contains one or more offers/bids on the plurality of inquiries contained in the inquiry list via the dealer interface. The respective offers/bids are displayed in the price-based inquiry list on the investor interface. The investor may receive the best response for each bond on the price-based inquiry list and, if desired, execute one or more trades using the investor interface.

20 Claims, 21 Drawing Sheets

FIG. 8

| MARKETAXESS #2 | | | | | | | | | | | |
|---|---|---|---|---|---|---|---|---|---|---|---|
| FILE GO OPTIONS HELP | | | | | | | | | | | |
| INVENTORY | ACTIVEs | TRADE | BID/OFFER LIST | MY PORTFOLIOS | | ACTIVITY | BLOTTER | | | | BID LIST |
| SZ(000s) | TICKER | CPN | MATURITY | BENCHMARK | CROSS | DLR | SP/YLD | COVER | STATUS | SPOT PX | |
| 17,000 | C | 5,700 | 02/06/04 NC* | MME | N/A | 5/18 | | | PENDING | N/A | |
| 6,000 | ABK | 9,375 | 08/01/11 NC | 4,000 11/12 | NO | 1/18 | | | PENDING | | |
| 4,500 | BUD | 5,600 | 07/06/06 NC | 5,875 11/05 | NO | 1/18 | | | PENDING | | |
| 5,000 | SBC | 6,650 | 08/29/03 NC | MME | N/A | 0/18 | | | PENDING | N/A | |
| 1,000 | GS | 3,500 | 09/04/08 C* | 3,000 11/07 | NO | 1/18 | | | PENDING | | |
| 1,250 | VZ | 6,125 | 06/15/07 NC | 3,000 11/07 | NO | 0/18 | | | PENDING | | |
| 500 | VZ | 4,625 | 06/01/05 C | 1,750 12/04 | NO | 0/18 | | | PENDING | | |
| 1,000 | T | 6,500 | 03/15/13 MW* | 4,000 11/12 | NO | 0/18 | | | PENDING | | |
| 6,000 | C | 7,500 | 03/15/04 NC | 1,750 12/04 | NO | 0/18 | | | PENDING | | |
| 15,000 | DD | 3,375 | 11/15/07 MW | 3,000 11/07 | NO | 1/18 | | | PENDING | | |
| 600 | Z | 5,500 | 06/01/06 C* | 3,000 11/07 | NO | 0/18 | | | PENDING | | |
| 1,000 | K | 6,000 | 04/01/06 MW* | 5,875 11/05 | NO | 0/18 | | | PENDING | | |

REMARK: LIQUIDATING PORTFOLIO
☐ REMARK WILL NOT AFFECT TRADE TERMS.

INQ. # 001282600   VIEW DETAILS   CANCEL LIST   NEW LIST   RESPONSES DUE: 1:14

ACTIVITY LOG
13:12:40 CAPITAL (QACLIENT27) REQUESTS 12 ITEM BID LIST FOR 58,850,000 DUE AT 13:15 (ET) AUTO SPOT TO ABN,BARC,BAS,BNPP,BSC,C,CSFB,DB,GS,HSBC,JPM,LEH,MA,MER,MS,ONE,SLK,UBS-REMARK- LIQUIDATING PORTFOLIO 13.13.16 | 12 ITEMS TOTAL VOLUME - 58,850,000 | BONDTICKER | RESEARCH | NOTICES
CONNECTED

FIG. 9

| SZ(000s) | TICKER | CPN | MATURITY | BENCHMARK | CROSS | DLR | SP/YLD | COVER | STATUS | SPOT PX | | |
|---|---|---|---|---|---|---|---|---|---|---|---|---|
| 17,000 | C | 5,700 | 02/06/04 NC* | MME | N/A | MS | 22.0 | N/A | RESP REQ | N/A | HIT | PASS |
| 6,000 | ABK | 9,375 | 08/01/11 NC | 4,000 11/12 | NO | MS | 55.0 | 56.0 | RESP REQ | | HIT | PASS |
| 4,500 | BUD | 5,600 | 07/06/06 NC | 5,875 11/05 | NO | | | 85.5 | RESP REQ | | HIT | PASS |
| 5,000 | SBC | 6,650 | 08/29/03 NC | MME | N/A | | | N/A | RESP REQ | N/A | HIT | PASS |
| 1,000 | GS | 3,500 | 09/04/08 C* | 3,000 11/07 | NO | MS | 12.0 | 44.0 | RESP REQ | | HIT | PASS |
| 1,250 | VZ | 6,125 | 06/15/07 NC | 3,000 11/07 | NO | MS | 123.0 | 123.0 | RESP REQ | | OPEN | PASS |
| 500 | VZ | 4,625 | 06/01/05 C | 1,750 12/04 | NO | MS | 89.0 | 90.0 | RESP REQ | | HIT | PASS |
| 1,000 | T | 6,500 | 03/15/13 MW* | 4,000 11/12 | NO | MS | 69.0 | 90.0 | RESP REQ | | HIT | PASS |
| 6,000 | C | 7,500 | 03/15/04 NC | 1,750 12/04 | NO | MS | 77.0 | 77.0 | RESP REQ | | OPEN | PASS |
| 15,000 | DD | 3,375 | 11/15/07 MW | 3,000 11/07 | NO | | | N/A | DNT | N/A | | |
| 600 | Z | 5,500 | 06/01/06 C* | 3,000 11/07 | NO | | | N/A | DNT | N/A | | |
| 1,000 | K | 6,000 | 04/01/06 MW* | 5,875 11/05 | NO | MS | 102.0 | 102.5 | RESP REQ | | OPEN | PASS |

INQ. # 001633300   RESPONSES GOOD FOR: 9:22

ACTIVITY LOG
13:37:07 DEALER RESPONSES HAVE BEEN RELEASED FROM THE HOLDING BIN
13:32:22 CAPITAL (QACLIENT27) REQUESTS 12 ITEM BID LIST FOR 58,850,000 DUE AT 13:37 (ET), AUTO SPOT TO
   ABN,BARC,BAS,BNPP,BSC,C,CSFB,DB,GS,HSBC,JPM,LEH,MA,MER,MS,ONE,SLK,UBS 13.37.43  12 ITEMS TOTAL VOLUME - 58,850,000   BONDTICKER   RESEARCH   NOTICES
CONNECTED

FIG. 11

| MARKETAXESS #2 | | | | | | | | | | | |
|---|---|---|---|---|---|---|---|---|---|---|---|
| FILE GO OPTIONS HELP | | | | | | | | | | | |

INVENTORY | ACTIVEs | TRADE | BID/OFFER LIST | MY PORTFOLIOS | ACTIVITY | BLOTTER          BID LIST

| SZ(000s) | TICKER | CPN | MATURITY | BENCHMARK | CROSS | DLR | SP/YLD | COVER | STATUS | SPOT PX |
|---|---|---|---|---|---|---|---|---|---|---|
| 17,000 | C | 5,700 | 02/06/04 NC* | MME | N/A | MS | 22.0 | N/A | | N/A |
| 6,000 | ABK | 9,375 | 08/01/11 NC | 4,000 11/12 | DW | MS | 55.0 | N/A | | |
| 4,500 | BUD | 5,600 | 07/06/06 NC | 5,875 11/05 | NO | | | N/A | | HIT  PASS |
| 5,000 | SBC | 6,650 | 08/29/03 NC | MME | N/A | | | | | |
| 1,000 | GS | 3,500 | 09/04/08 C* | 3,000 11/07 | DW | MS | 12.0 | | | |
| 1,250 | VZ | 6,125 | 06/15/07 NC | 3,000 11/07 | NO | MS | 123.0 | | | |
| 500 | VZ | 4,625 | 06/01/05 C | 1,750 12/04 | NO | MS | 89.0 | | | |
| 1,000 | T | 6,500 | 03/15/13 MW* | 4,000 11/12 | NO | MS | 69.0 | | | |
| 6,000 | C | 7,500 | 03/15/04 NC | 1,750 12/04 | NO | MS | 77.0 | | | |
| 15,000 | DD | 3,375 | 11/15/07 MW | 3,000 11/07 | NO | | | N/A | DNT | |
| 600 | Z | 5,500 | 06/01/06 C* | 3,000 11/07 | NO | | | N/A | DNT | |
| 1,000 | K | 6,000 | 04/01/06 MW* | 5,875 11/05 | NO | MS | 102.0 | N/A | | |

CONFIRM PASS

YOU ARE PASSING ON BID 5,509 07.05.2006

CONFIRM PASS?

YES    NO

1200

INQ. # 001158700                                    RESPONSES GOOD FOR: 3:44

ACTIVITY LOG
16:25:03 BID OF +102.0 FROM MS (MS-CHRIST1) ON 1,000,000 K 6.000 04/01/2005 ACCEPTED BY CAPITAL
         (QACLIENT27)
16:24:46 BID OF +55.0 FROM MS (MS-CHRIST1) ON 6,000,000 ABK 9.375 06/01/2011 ACCEPTED BY CAPITAL
         (QACLIENT27)
16:24:42 BID OF 3.122% (MME TLD) FROM MS (MS-CHRIST1) ON 17,000,000 C 5.700 02/06/2004 ACCEPTED BY 16.25.15 | 12 ITEMS TOTAL VOLUME - 58,850,000 | BONDTICKER  RESEARCH  NOTICES
CONNECTED

FIG. 12

| MARKETAXESS #2 | | | | | | | | | | |
|---|---|---|---|---|---|---|---|---|---|---|
| FILE GO OPTIONS HELP | | | | | | | | | | |
| INVENTORY | ACTIVEs | TRADE | BID/OFFER LIST | MY PORTFOLIOS | | ACTIVITY | BLOTTER | | BID LIST | |
| SZ(000s) | TICKER | CPN | MATURITY | BENCHMARK | CROSS | DLR | SP/YLD | COVER | STATUS | SPOT PX |
| 17,000 | C | 5,700 | 02/06/04 NC* | MME | N/A | MS | 22.0 | N/A | | N/A |
| 6,000 | ABK | 9,375 | 08/01/11 NC | 4,000 11/12 | DW | MS | 55.0 | N/A | | |
| 4,500 | BUD | 5,600 | 07/06/06 NC | 5,875 11/05 | NO | | | N/A | YOU PASS | |
| 5,000 | SBC | 6,650 | 08/29/03 NC | MME | N/A | | | N/A | DNT | N/A |
| 1,000 | GS | 3,500 | 09/04/08 C* | 3,000 11/07 | DW | MS | 12.0 | N/A | | |
| 1,250 | VZ | 6,125 | 06/15/07 NC | 3,000 11/07 | NO | MS | 123.0 | N/A | | |
| 500 | VZ | 4,625 | 06/01/05 C | 1,750 12/04 | NO | MS | 89.0 | N/A | | |
| 1,000 | T | 6,500 | 03/15/13 MW* | 4,000 11/12 | NO | MS | 69.0 | N/A | | |
| 6,000 | C | 7,500 | 03/15/04 NC | 1,750 12/04 | NO | MS | 77.0 | N/A | INCOMPLETE | PHONE |
| 15,000 | DD | 3,375 | 11/15/07 MW | 3,000 11/07 | NO | | | N/A | DNT | |
| 600 | Z | 5,500 | 06/01/06 C* | 3,000 11/07 | NO | | | N/A | DNT | |
| 1,000 | K | 6,000 | 04/01/06 MW* | 5,875 11/05 | NO | MS | 102.0 | N/A | | |

REQ. SPOT — 1410
ACCPT :08 — 1420
REQ. SPOT
REQ. SPOT
REQ. SPOT
REQ. SPOT

INQ. # 001158700                                SPOT PROCESS TIMER: 9:22

ACTIVITY LOG
16:27:45 BID OF +77.0 FROM MS {MS-CHRIST1} ON 6,000,000 C 7.500 03/15/2004 ACCEPTED BY CAPITAL
    (QACLIENT27)
16:27:37 BID OF +89.3 FROM MS {MS-CHRIST} ON 1,000,000 T 6.500 03/15/2013 ACCEPTED BY CAPITAL
    (QACLIENT27)
16:27:34 BID OF +88.3 FROM MS {MS-CHRIST} ON 500,000 VZ 4.625 06/01/2006 ACCEPTED BY CAPITAL 16.26.00   12 ITEMS TOTAL VOLUME - 58,850,000         BONDTICKER   RESEARCH   NOTICES
                                                                          CONNECTED

FIG. 14

| MARKETAXESS #2 | | | | | | | | | | |
|---|---|---|---|---|---|---|---|---|---|---|
| FILE GO OPTIONS HELP | | | | | | | | | | |
| INVENTORY | ACTIVEs | TRADE | BID/OFFER LIST | MY PORTFOLIOS | | ACTIVITY | BLOTTER | | | BID LIST |
| SZ(000s) | TICKER | CPN | MATURITY | BENCHMARK | CROSS | DLR | SP/YLD | COVER | STATUS | SPOT PX |
| 17,000 | C | 5,700 | 02/06/04 NC* | MME | N/A | MS | 22.0 | N/A | DONE | N/A |
| 6,000 | ABK | 9,375 | 08/01/11 NC | 4,000 11/12 | DW | MS | 55.0 | N/A | DONE | 99-000 |
| 4,500 | BUD | 5,600 | 07/06/06 NC | 5,875 11/05 | NO | | | N/A | YOU PASS | |
| 5,000 | SBC | 6,650 | 08/29/03 NC | MME | N/A | | | N/A | DNT | N/A |
| 1,000 | GS | 3,500 | 09/04/08 C* | 3,000 11/07 | DW | MS | 12.0 | N/A | DONE | 97-000 |
| 1,250 | VZ | 6,125 | 06/15/07 NC | 3,000 11/07 | NO | MS | 123.0 | N/A | INCOMPLETE | PHONE |
| 500 | VZ | 4,625 | 06/01/05 C | 1,750 12/04 | NO | MS | 89.0 | N/A | INCOMPLETE | PHONE |
| 1,000 | T | 6,500 | 03/15/13 MW* | 4,000 11/12 | NO | MS | 69.0 | N/A | INCOMPLETE | PHONE |
| 6,000 | C | 7,500 | 03/15/04 NC | 1,750 12/04 | NO | MS | 77.0 | N/A | DONE | 98-000 |
| 15,000 | DD | 3,375 | 11/15/07 MW | 3,000 11/07 | NO | | | N/A | DNT | |
| 600 | Z | 5,500 | 06/01/06 C* | 3,000 11/07 | NO | | | N/A | DNT | |
| 1,000 | K | 6,000 | 04/01/06 MW* | 5,875 11/05 | NO | MS | 102.0 | N/A | DONE | 102-000 |

| INQ. # 001158700 | VIEW DETAILS | RESUBMIT LIST | NEW LIST | DOWNLOAD LIST | — 1540 |
|---|---|---|---|---|---|

ACTIVITY LOG — 1550
16:26:59 SPOT PROCESS COMPLETED, 6 POTENTIAL AUTO SPOT (S) WITH 0 SUCCESS(0) CONFIRM REMAINING SPOT
    LEVELS AND FINAL 6 PRICES VIA PHONE
16:27:45 BID OF +77.0 FROM MS (MS-CHRIST1) ON 6,000,000 C 7,500 03/15/2004 ACCEPTED BY CAPITAL
    (QACLIENT27)
16:27:37 BID OF +89.3 FROM MS (MS-CHRIST) ON 1,000,000 T 6,500 03/15/2013 ACCEPTED BY CAPITAL

| 16.32.58 | 12 ITEMS TOTAL VOLUME - 58,850,000 | BONDTICKER | RESEARCH | NOTICES |
|---|---|---|---|---|
| | | | | CONNECTED |

ELECTRONIC PRICE-BASED INQUIRY LISTS FOR FINANCIAL PRODUCTS

CROSS-REFERENCE TO RELATED APPLICATIONS

This application claims the benefit under 35 U.S.C. §119 (e) of U.S. Provisional Patent Application No. 60/842,798, filed Sep. 7, 2006, which is hereby incorporated by reference herein in its entirety.

The following co-pending patent applications are related to this application and are all hereby incorporated by reference herein in their entireties:

U.S. patent application Ser. No. 10/026,358, filed Dec. 24, 2001, entitled Method and System for Computer-Implemented Trading of New Issue Debt Securities;

U.S. patent application Ser. No. 10/026,359, filed Dec. 24, 2001, entitled Method and System for Computer-Implemented Trading of Secondary Market Debt Securities;

U.S. patent application Ser. No. 10/778,993, filed Feb. 13, 2004, entitled Method and System for Computer-Implemented Trading of New Issue Debt Securities;

U.S. patent application Ser. No. 10/779,082, filed Feb. 13, 2004, entitled Method and System for Computer-Implemented Trading of Secondary Market Debt Securities; and U.S. patent application Ser. No. 10/672,379, filed Sep. 26, 2003, entitled Electronic Inquiry Lists for Financial Products.

COPYRIGHT NOTICE

A portion of this patent document contains material which is subject to copyright protection. The copyright owner has no objection to the facsimile reproduction by anyone of the patent document, as it appears in the Patent and Trademark Office patent files or records, but otherwise reserves all copyright rights whatsoever.

FIELD OF THE INVENTION

The invention relates generally to electronic or electronic assisted trading. More particularly the invention relates to the use of price-based inquiry lists for the purpose of trading, by buying or selling a variety of different financial products or financial instruments with a number of different trading parties.

BACKGROUND OF THE INVENTION

There are many approaches to bringing buyers and sellers together in financial markets. These approaches can generally be assigned to one of two categories: exchange traded markets, or over-the-counter markets. Market participants face particular challenges to economic efficiency in over-the-counter markets where market-makers are more disparate than on exchanges and assets can trade in multiple locations at multiple prices simultaneously. Over-the-counter trading is prone to the risk of fragmentation wherein certain buyers and sellers do not have access to the full range of liquidity available in the marketplace increasing the costs of execution or even impeding execution. Also, there may be a resultant lack of transparency where some participants do not see the most recent and accurate prices for a given asset, increasing price volatility and decreasing the quality of execution. Although inefficiencies in price discovery from fragmentation and lack of transparency are not limited to over-the-counter markets, they are particularly salient in markets where there is no central exchange to concentrate the communication of buyers and sellers and provide structures to maintain orderly markets.

With the growth of trading financial products (such as, for example, stocks, options, futures, bonds and other fixed income securities, forward contracts, commodities and commodities contracts, and the like) over-the-counter, market participants have an increasing need to add efficiencies in their trading operations. One area where efficiencies have been late to arrive is in inquiry lists—or the ability to request bids or offers on multiple issues simultaneously. This process has conventionally been labor intensive. An institutional investor may put together a list of items to sell and items to buy. These lists are then disseminated to various dealers for reply. For many years this process was done using a combination of paper, telephone, Teletype and fax machines. Lists are sent to one or more dealers with due-in times set for later that day (or beyond). Dealer responses come back to the investor at various times via various means (phone, fax, teletype, etc.). The responses are collated and analyzed by the sender. Ultimately the investor would make decisions to buy or sell (or not buy or sell) based on the analysis of the data. This work is labor intensive for both the institutional investor and the dealer. It is not uncommon for this process to take many man-hours, primarily due to the need to collate the data and then analyze the responses before acting on the responses and then again spend more time on the latter stages of a trade when final pricing and other particulars need to be agreed for each list item.

One area where efficiencies have been late to arrive is in inquiry lists—or the ability to request bids or offers on multiple issues simultaneously. This process has always been labor intensive. An institutional investor may put together a list of items to sell and items to buy. These lists are then disseminated to various dealers for reply. For many years this process was done using a combination of paper, telephone, Teletype and fax machines. Lists are sent to one or more dealers with due-in times set for later that day (or beyond). Dealer responses come back to the investor at various times via various means (phone, fax, teletype, etc.). The responses are collated and analyzed by the sender. Ultimately the investor would make decisions to buy or sell (or not buy or sell) based on the analysis of the data. This work is labor intensive for both the institutional investor and the dealer. It is not uncommon for this process to take many man-hours, primarily due to the need to collate the data and then analyze the responses before acting on the responses and then again spend more time on the latter stages of a trade when final pricing and other particulars need to be agreed for each list item.

With the advent of proprietary networks and the Internet, communication methods such as email and the like have, to some extent, streamlined the process. For example, using a standard email account, investors can post their bid and/or offer lists to one or more dealers. Recipients of the lists can review the list and respond at or before a specified time. Although this method is more efficient than previous means, investors were still required to collate the responses across several mediums and analyze the responses, and then again through various mediums act on said responses until each item on the list is traded or not traded.

There are many reasons why institutional investors may try to perform multiple transactions at or near the same time. One example of this can be found in the area of portfolio management. For example, portfolio managers and other market participants find the need from time to time to re-balance their portfolios. Although this can and does happen at any time, this is a common occurrence near month end and quarter end.

When going through this re-balancing process the portfolio manager may decide to do one or more of the following:
  Reduce their position on certain holdings in the portfolio
  Remove certain holdings from the portfolio
  Increase their position on existing holdings in the portfolio
  Add new items to the portfolio Conventional methods for trading various quantities of a certain bond or multiple bonds in a secondary market require the seller to locate a buyer or buyers in a "bids-wanted" process. This process utilizes a broker intermediary for settlement in a process that causes the buyer and seller to appear anonymous to each other. There are a number of important disadvantages to these conventional processes.

First, any "bids-wanted" process limits trading to the inventory presented by sellers. Bids-wanted is a seller-initiated process, with buyers in a reactive mode. This is generally consistent with the municipal bonds market focused on by some prior art. See, for example, U.S. Pat. No. 5,915,209, issued on Jun. 22, 1999 and entitled "Bond Trading System." The municipal bond market is inventory driven. There are numerous small unique lots of bonds. Municipal bond buyers peruse lists of bonds each day that are available either in the secondary market or by primary offerings. Broker/dealers in the municipal bond market act predominantly on an agency basis connecting buyers and sellers since municipal bonds do not have an active "bonds borrowed" market that would enable sellers to sell bonds they don't own (i.e. "short" bonds). This contrasts with the government bond market and the corporate bond market where there are active security lending markets. The MA system allows for offer lists as well as bid lists. Offer lists allow the buyer to initiate a process, selecting a bond or list of bonds for trading from a reference database without limitation as to whether or not such bond is any system participants' inventory. The offer list allows the buyer to present a list of desired bonds to a selected group of dealers whereupon each dealer may return with offers. The MA system maintains a reference database of potential issues that may be selected, in a manner that buyers and sellers accept as an acceptable standard for defining the bond to be transacted.

Second, a broker intermediated anonymous settlement process is fundamentally different from a direct counter-party settlement where the parties are known to each other prior to trade execution. The prior art broker process allows various parties to trade with each other without those parties having any established financial or credit relationship with each other. The various parties need only have a credit relationship with the central broker in order to conduct their transactions. In the past, this was the most feasible method of conducting such transactions because of the unwieldy task of creating, maintaining, and referencing a database of unique and dynamic trading and credit relationships between numerous parties in the financial markets. However, this presents multiple limitations to investors, particularly to investors in less liquid products (e.g., products which do not mostly trade on an exchange), investors in credit products such as corporate bonds, and also to large investors.

Investors in less liquid or illiquid products derive considerable economic value from developing and maintaining direct relationships with a number of dealer market-makers who, on the basis of that relationship, are willing to take risk as a principal (i.e. put up their own balance sheet) to buy bonds from the investor or sell bonds that they do not own to the investor. This liquidity expectation reduces the liquidity component of an investor's net value at risk. In the past, the investor had to balance the needs to maintain relationship versus the economic efficiencies of being able to show bonds, for example on a bids-wanted basis, to a large number of dealer in a timely manner. The MA system allows the investor to gain the economic efficiency of instantaneous communication with many without having to give up the ability to transact business in a way that counts towards their relationship building. The MA system establishes a number of criteria required for participation and provides a unique facility that permits the creation, maintenance, and referencing of thousands of distinct economic relationships. These relationships are defined across a matrix including legal entities, members of legal entities, products, and jurisdictions. The MA system provides for the instantaneous retrieval and control by these relationships at the moment of bid or offer list creation by an investor. The investor can see their relationships in the MA system, and can select from those relationships and transact by directly with those relationships.

SUMMARY OF THE INVENTION

The preferred embodiments of the invention provide an electronic interface providing clients with the ability to create and submit multi-issue, price-based inquiries to multi-dealers, via one integrated system. The system then allows for multi-dealer responses to these multi-issue, price-based inquiries and allows for the client to execute (trade on) any one or more of the issues.

Instead of relying on a central broker to maintain the anonymity of the buyer and seller, the preferred embodiments of the invention use a model where the potential counterparties (the investor and the dealer recipients) have an established relationship. All price-based inquiry list negotiations and trades are done without intermediation of a third party. The buyer and seller of each instrument are fully known to each other throughout the trading process.

A preferred implementation of the invention is a device, such as a computer, that enables performing the entire list transaction process from entry of interests to completion of transaction. The device is self-contained in being able to gather, disseminate, and process information relevant to list transactions, and make state transitions based upon that information. This streamlined approach adds efficiencies by reducing the amount of time and errors associated with the process.

The preferred embodiments of the invention employ various trading protocols depending on instrument type and industry convention. It is determined merely, by the nature of the instrument, whether or not the item is traded in a one-step price method, two-step yield/price or discount margin/price method or a three-step spread/benchmark price/bond price method.

At all times each participant to a price-based inquiry list is aware of the protocol employed, the current state of the list, the time remaining in that state, and what is expected of each participant during each state. This method adds order and efficiency to a process that was beforehand less organized and therefore more time-consuming.

Instead of being limited to addressing the sellers concerns by providing for a "bids wanted" process, the preferred embodiments of the invention provide for price-based inquiry lists to be in the form of either bid list or offer list, each list containing multiple identifiers. All individual items in the list are independent from other items. The ability to create and submit the items together is primarily done to allow the user to perform the work more efficiently.

As part of creating the list, list initiators set various parameters such as the specific identifiers on the list, whether the items are traded as outright or crossed with an underlying benchmark, the "due in" time for the responses, the "good for" time for which each response is actionable and a selection of dealer(s) to receive the list.

The preferred embodiments of the invention allow the sender to initiate a process, selecting a bond or list of bonds for trading from a reference database without limitation as to whether or not such bond is in any system participants' inventory. Once the items are selected and a corresponding size for each item entered, and other relevant parameters set, the price-based inquiry list can be presented simultaneously to a selected group of dealers whereupon each dealer may return with spread, yield, discount margin or price levels (depending on instrument type) where they are willing to transact on each list item.

During and after the price-based inquiry list has been submitted, both the list initiator and dealer can easily recall the list from their activity console (and at certain points download the information). All items on the list are "rolled-up" and displayed as one line item. By clicking on the line item the user can "explode" the list and see each individual item in the list as well as the status of each line item.

The preferred embodiments of the invention streamline the entire trading process from list creation through trade negotiation and execution.

In accordance with some embodiments of the present invention, systems and methods for creating and executing price-based inquiry lists between an initiator and multiple respondents are provided. A list creation state that that allows an initiator to enter an inquiry list of items of buying or selling interest with select volumes may be provided. The list creation state may then transition to a list response state. The list response state transmits the inquiry list to one or more dealers and then receives one or more offers or bids for one or more items on the inquiry list from the one or more dealers. In response to receiving two or more offers or bids for an item of the inquiry list, the best responses for each item on the inquiry list may be selected.

The list response state may then transition to a list trade state. The list trade state provides the initiator with an opportunity to execute a trade on one or more items on the inquiry list at the best responses. The prices for the items on the price-based inquiry list are determined based on the best responses received from the one or more dealers. After, for example, the "due in" timer expiring, the list trade state transitions to a list complete state. The list complete state may provide the initiator and the one or more dealers with a notification indicating whether each item on the list was traded or not traded.

It should be noted that no further action is needed by the initiator or the one or more dealers to complete the trade. It should also be noted that the initiator and the one or more dealers have an established relationship prior to entering the list creation state.

In some embodiments, a subject state may be provided, where the subject state provides the initiator with an opportunity to request a repeat from one or more dealers that previously provided best responses.

In some embodiments, a notification to a dealer that provided a best response for an item on the inquiry list may be transmitted, where the notification indicates to that dealer that the initiator remains interested in executing a trade on that item.

In some embodiments, the initiator may be provided with an opportunity to select a dealer for requesting a repeat when two or more dealers are tied for providing a best response.

In some embodiments, a subject state timer is provided and a request for repeat for an item on the inquiry list may be made when the subject state timer has not expired.

In some embodiments, the initiator and the one or more dealers that provided best responses may be prevented from negotiating.

In some embodiments, a response to the request for repeat may be received from a dealer. In response, the system may automatically trade the particular item from the dealer and notify the initiator and the dealer of the trade.

Thus, there has been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and description matter in which there are illustrated preferred embodiments of the invention.

BRIEF DESCRIPTION OF THE DRAWINGS

For a fuller understanding of the preferred embodiments, reference is made hereafter to the following description taken in connection with the accompanying drawings, which are meant to be exemplary and not limiting, in which like references are intended to refer to like or corresponding parts, and in which:

FIG. 8 is an example of a list initiator's partially completed inquiry list edit screen display according to a preferred embodiment of the invention;

FIG. 9 is an example of a list initiator's submitted (i.e., pending) inquiry list screen display according to a preferred embodiment of the invention;

FIG. 11 is an example of a list initiator's inquiry list screen display with dealers' responses according to a preferred embodiment of the invention;

FIG. 12 is an example of a list initiator's inquiry list screen display during the state when the user is performing either a hit/lift/pass action on each list item according to a preferred embodiment of the invention;

FIG. 14 is an example of a list initiator's inquiry list screen display with Request Spot buttons and Spot Accept timers according to a preferred embodiment of the invention;

FIG. 15 is an example of a list initiator's inquiry list screen display after the spotting process is complete according to a preferred embodiment of the invention;

FIG. 19 is an example of illustrative screens that may be displayed to the user for creating a price-based inquiry list and submitting the price-based inquiry list to one or more dealers in accordance with some embodiments of the present invention; and FIG. 20 is an example of illustrative screens that may be displayed to the user for executing one or more items on the price-based inquiry list and confirming the executed trades in accordance with some embodiments of the present invention.

DETAILED DESCRIPTION OF THE INVENTION

Figure 1:
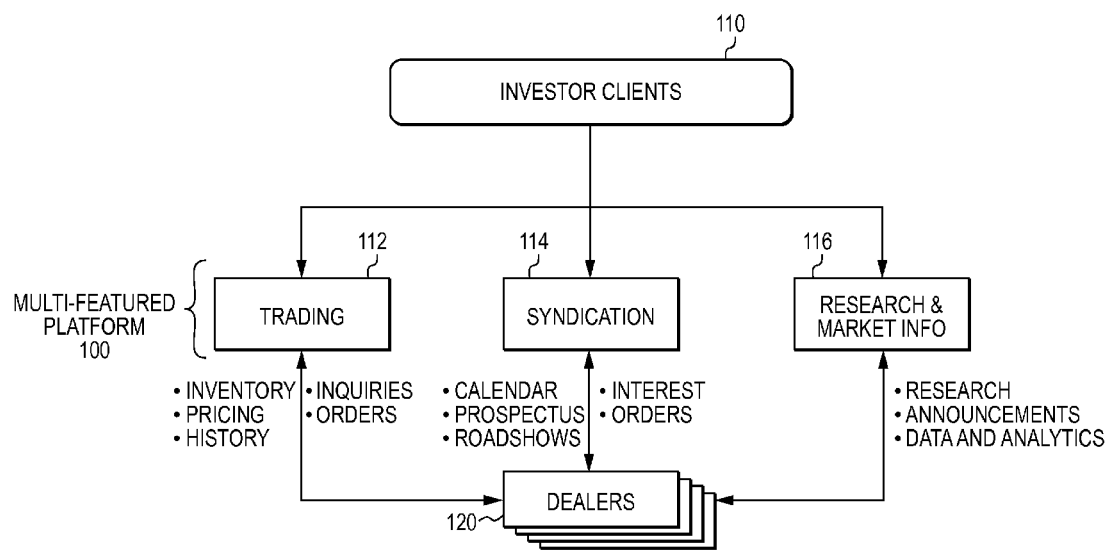
FIG. 1 illustrates an overview of a multi-featured platform for electronic or electronic-assisted trading of financial products.

In accordance with the present invention, systems and methods for creating and executing items (e.g., financial instruments, security instruments, and the like) in a price-based inquiry list are provided. Price-based inquiry lists for financial interests are submitted, negotiated and traded between investors and dealers over a network or networks. The investor or initiator can create a price-based inquiry list via one or more investor interfaces including a plurality of inquiries for a plurality of different financial interests. The price-based inquiry list may be transmitted to one or more dealers selected by the initiator, where an established relationship exists between the initiator and the dealers. One or more of the selected dealers may provide responses to the received price-based inquiry list, where the responses may contain one or more offers or bids on the plurality of inquiries contained in the price-based inquiry list. The respective offers/bids are displayed to the initiator in the price-based inquiry list. The initiator may receive the best response for each item on the price-based inquiry list and, if desired, execute one or more trades using the interface.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described process may be altered so that certain processes are conducted in parallel or independent, with other processes, to the extent that the processes are not dependent upon each other. Thus, the specific order of steps described herein is not to be considered implying a specific sequence of steps to perform the process. Other alterations or modifications of the above processes are also contemplated. For example, further insubstantial approximations of the process and/or algorithms are also considered within the scope of the processes described herein.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

FIG. 1 illustrates an overview of a multi-featured platform in accordance with a preferred embodiment of the present invention. Generally, the platform 100 provides computer-implemented trading functions 112, syndication 114 and research and marketing information 116 functions for a number of investor clients 110 and dealers 120. In one business implementation, the investors are clients (also sometimes referred to as users) of the organization that runs the platform, while the dealers are participants, or even have partnership arrangements, with the organization. The trading functions 112 include providing an inventory of available financial products (such as bond issues), trade negotiation, and a history of transactions for record-keeping purposes. The trading functions 112 also enable investors to submit price-based inquiry lists for, and make trades in, financial products according to the preferred embodiments described below.

Syndication generally refers to the process of having a group of banks acting together, to underwrite a new issue of bonds. Specifically, the syndication functions 114 include providing a calendar of new issues, including the managers of the issue, details of the issue (sometimes referred to as a "term sheet"), such as type of bond issue, term, coupon, rating, announcement date, pricing date and so forth. The syndication function 114 may also include links to on-line prospectuses for the issues, and marketing presentations. The syndication function 114 also allows investors to submit indications of interest (IOIs) in new bond issues to allow the underwriters/dealers to determine the demand for the issue. The dealers will track the investors IOIs in the Issue Book and subsequently allocate those orders and set a final price. The research and marketing information 116 functions may include on-line research reports regarding the bond issues, announcements, and other data and analytics, which are tools for analyzing bond issues.

Figure 2:
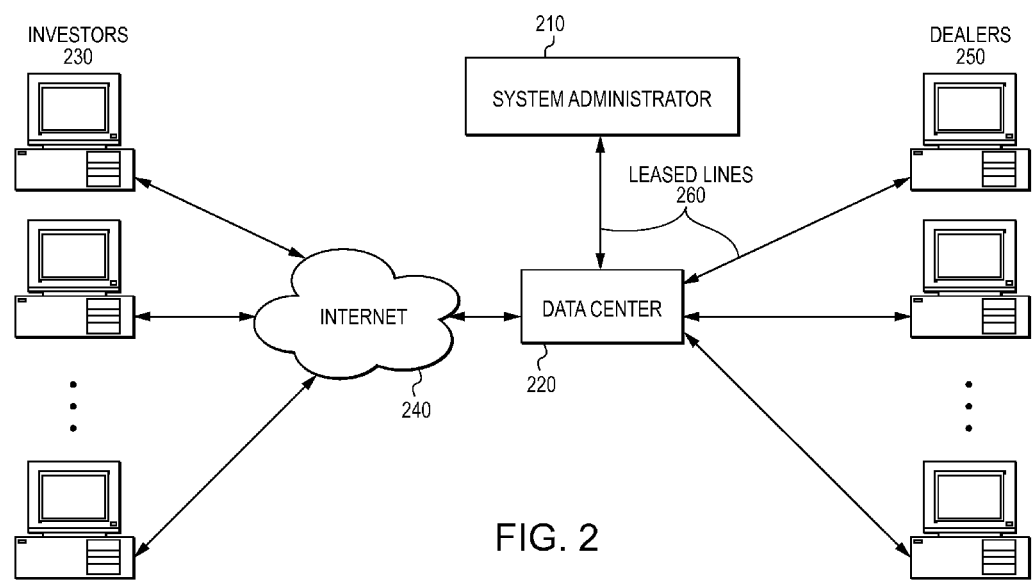
FIG. 2 illustrates a high level system diagram of an electronic or electronic-assisted trading system.

FIG. 2 illustrates a high-level system diagram in accordance with the present invention. Here, a data center 220 includes a number of centralized computing resources for storing, processing and routing data between the investors' computers 230 and the dealers' computers. Specifically, the data center 220 and computers 230, 250 may employ any type of computing hardware and software known to those skilled in the art as being capable of carrying out the functions described herein. A computer program product, such as an optical, magnetic or other type of data storage device, may be included or provided that includes software for programming the computers to perform the desired functions. The product may include a computer usable medium having computer readable program code means embodied therein for providing the desired functions. The investor and dealer computers 230, 250 may be personal computers or workstations, for example, while the data center 220 may employ known servers, backup storage devices, network communications devices and so forth. Generally, a networked application may be written using any available programming language for running at the data center 220, and at the computers 230, 250. The data center 220 provides a central clearinghouse for the dealers and investors, and is typically located remotely. A system administrator 210 oversees and maintains the data center 220.

In one possible implementation, the investors 230 communicate with the data center 220 via an Internet-Protocol based network 240. Network 240 may be the Internet or a portion of network 240 may comprise a portion of the Internet. The dealers 250 may communicate with the data center 220 via secure leased lines 260, such as Ti lines. Of course, other variations are possible, but the implementation shown is believed to be appropriate for situations where the number of dealers 250 is relatively small, and the number of investors 230 is relatively large.

Figure 3:
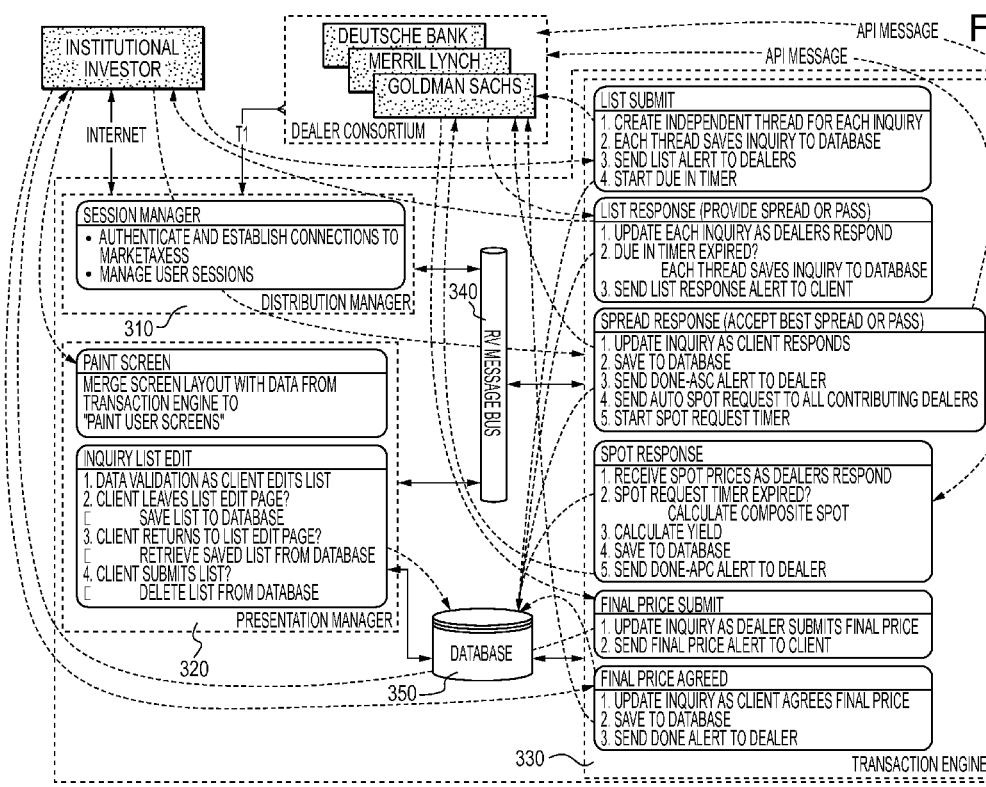
FIG. 3 is a logical diagram of the software of a computer or data processing system suitable for use in implementing an embodiment of the invention.

FIG. 3 illustrates an exemplary software architecture of a computer or other data processing system in data center 220 suitable for use in implementing the electronic or electronic assisted trading of financial interests according to an embodiment of the invention. Although a single institutional investor is shown to be connected to the computer via the Internet, it should be understood that there can be a large number of connected users, which need not necessarily connect via the Internet and need not necessarily be institutional investors. Similarly, although FIG. 3 shows a dealer consortium consisting of Deutsche Bank, Merrill Lynch and Goldman Sachs connected via a T1 line, it should be understood that there may be any number or combination of dealers and that the dealers preferably connect to the computer via separate secure communication paths. Furthermore, although FIG. 3 shows API (Application Programming Interface) messages and other messages (indicated by dashed lines) being sent directly between portions of the software and the external dealers and investors, it should be understood that these messages are not sent directly but are, in fact, sent through the illustrated communication paths (Internet and T1).

As shown in FIG. 3, the software in the computer or data processing system is preferably comprised of a distribution manager 310, a presentation manager 320, a transaction engine 330, a RV message bus 340 "connecting" each of the above, and a database 350. It should be understood that these elements are logically distinct, but need not be physically distinct or even distinct in their programming, such as constituting different executable program files or different modules. Database 350 is separate and distinct, and is preferably a conventional relational database with interfaces available to permit data to be saved, modified and retrieved quickly in real-time or near real-time.

Distribution manager 310 includes a session manager which is responsible for authenticating and establishing connections between the trading system and the external users and dealers. It also manages the communication sessions between the trading system and the users. Preferably, distribution manager uses or is based upon commercially available software suitable for carrying out these functions. It should be understood that the users and dealers need not use standard Internet browser software for communications. Indeed, it is preferable that the parties utilize software that is well suited for trading in financial interests and pass messages according to a suitable messaging protocol, such as messages according to a predefined XML data definition set.

Presentation manager 320 carries out a paint screen function which merges a screen layout with data from transaction engine 330 to provide a complete screen display ("paint user screens"). It also performs rudimentary functions relating to the entry of data on displayed inquiry lists. It validates data as it is entered or edited in an inquiry list by a user (client). If a user leaves an inquiry list edit page, it saves the inquiry list in database 350. If a user returns to an inquiry list edit page, presentation manager 320 retrieves the saved inquiry list from database 350. If a user submits an inquiry list to one or more dealers, then it deletes the list from database 350. Many of the functions may be carried out using known software program elements or they be carried out using program elements developed specifically for this trading system or similar trading systems.

Transaction engine 330 executes most of the logic associated with the trading system. It submits the inquiry lists, receives and aggregates the dealers' responses to the inquiry list, and depending on instrument type manages the spread, yield, discounted margin or price responses and if necessary the spot responses, and submits the final price for items on the inquiry list to the dealers and users. This aggregation occurs automatically as dealers' responses are received without the need for any intervention by the user.

Although transaction engine 330 can be implemented in different ways, it preferably creates an independent thread for each individual item on an inquiry list. Each such thread (a "worker" thread) is responsible for functions and actions unique to its individual item. For example, each worker thread asynchronously saves an associated inquiry in database 350. For each inquiry list, there are a number of worker threads corresponding to the number of items in the inquiry list and a master thread. The master thread carries out the functions common to all items in the inquiry list. For example, it sends the list alert for submitted lists to the dealers and starts the "Due In" timer described below.

Transaction engine 330 updates each item in the inquiry list as dealers respond thereto with, depending on instrument type, spread, yield, discount margin or price, or pass on the item. When the Due In timer expires, each thread saves the responses in database 350 and sends a response alert to the user. The threads also update the item as the user takes action on the dealers' responses by either hitting, lifting or passing, and saves the response to the database 350. Depending on instrument type it may then start a Spot Request Timer, sends a "DONE-ASC" (Done-awaiting spot confirmation) alert and an auto spot request to all contributing dealers as described in more detail below.

When required the transaction engine 330 also receives spot prices as the dealers respond, calculates the composite spot when the Spot Request Timer expires, and calculates yield in the spotting process. The threads for each item in the individual inquiry list save this information to database 350 and send the "DONE-APC" (Done-awaiting price confirmation) alert to the dealer. The transaction engine 330 also updates each item in the inquiry list as dealers submit the final price and sends a final price alert to the user. It updates the data and saves it to the database when the user agrees to the final price and sends a "DONE" alert to the corresponding dealer.

RV Message Bus 340 is not a physical data bus. It is a software interface between distribution manager 310, presentation manager 320, and transaction engine 330 that allows information to be passed there between. Such software is commercially available from Tibco, Inc. and similar software is commercially available from other sources.

Figure 4:
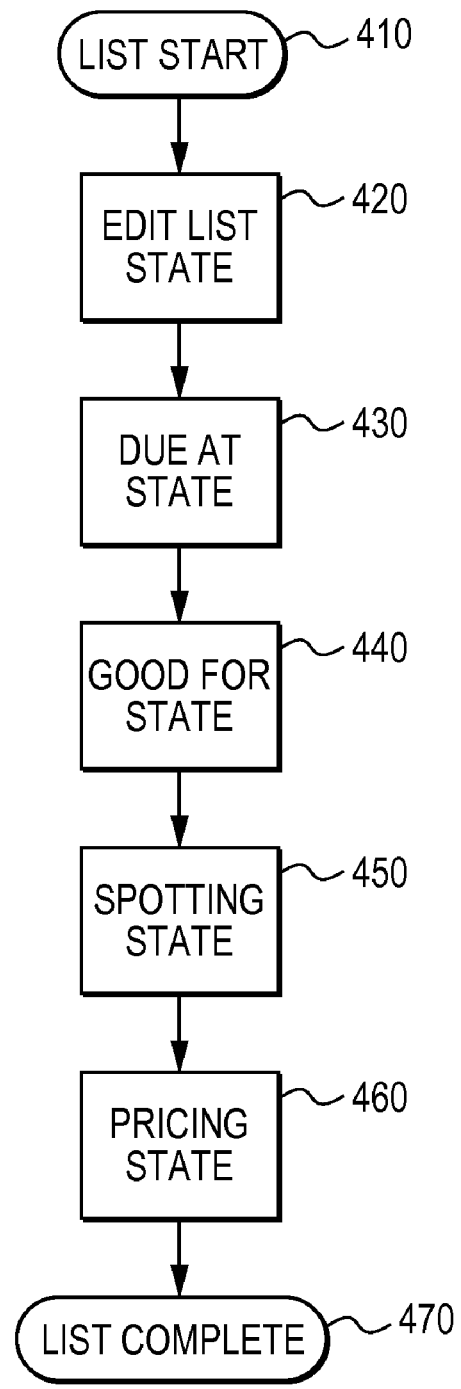
FIG. 4 illustrates a high level state diagram for inquiry lists showing the various states as an inquiry list passes back and forth from initiator to receiver.

Whereas FIG. 3 illustrates the inquiry list process from a system and logical standpoint, FIG. 4 illustrates a high level state diagram of an inquiry list business process carried out by a computer system from its inception through to its conclusion. FIGS. 5 and 6 continue to describe in greater detail the flow of an inquiry list process from a user's point of view including various decision points and alternate flows depending on those decisions.

In FIG. 4 the inquiry list process begins when the list initiator selects the "Bid/Offer List" option from the main view (410). He is then presented with an inquiry list edit screen (420). During the edit list state, the list initiator is creating a new list or modifying a list that was either previously sent or previously created but not sent. The list initiator populates the inquiry list by selecting items from an instrument database provided by the system or by selecting items from his uploaded portfolios. For each instrument on the inquiry list the list initiator then enters a size or amount that he wants to transact.

As defined by the system, certain financial instrument types require the list initiator to select a corresponding benchmark instrument. The benchmark instrument is selected from a separate group of system-defined instruments. During the negotiation and trading phase the financial instrument is quoted on a spread basis in relation to the selected benchmark instrument. After a spread is agreed, this benchmark instrument is used to price the financial instrument (the traded instrument).

For financial instruments that require the selection of a benchmark instrument, the list initiator must select the method for trading. The list initiator can choose to trade the financial instrument "outright" as a single transaction, or "cross" the instrument selected with the chosen benchmark instrument. For each item where "cross" is selected, the list initiator is looking to perform two simultaneous or near simultaneous opposing transactions; the buy/sell of the financial instrument and the sell/buy of the selected benchmark instrument.

After the list initiator enters in all the required information including the selection of the dealers for which he wants to send the list, he submits the list.

Once the list is submitted, it immediately goes into a Due At State (430). Recipients of the list are alerted that a list has been received. When the recipient opens the list, they can submit responses to any or all items on the list. Responses are sent to the list initiator during the response due in time. The list initiator can see the number of respondents, but all responses are kept in a "holding bin" and are not released or visible to the list initiator until the due in time has expired.

When the "due in" time expires, the "good for" timer begins to count down in Good For State (440). All responses to items on the list are presented to the list initiator in a straightforward manner. The list initiator is presented with all the responses to each inquiry with the "best" response and the "cover" (second best response) to each inquiry displayed on the same screen and along side each other. The list initiator can pass (elect to not trade) on any or all items or he can execute trades by "hitting" or "lifting" the response submitted—all from the main screen. The list initiator can do this in rapid succession until he has acted on all the items or until the "good for" time has expired. All items that are passed on by the list initiator will go into a DNT (Did not trade) state. All items that are traded (by hitting or lifting) will go into one of two states. Those items that require a benchmark price will go into a "Done-Awaiting Spot Confirmation" (Done-ASC) state, while traded items that do not require benchmark pricing will immediately go into a "Done-Awaiting Price Confirmation" (Done-APC) state.

After the list initiator has acted on all items on the list and has traded on at least one list item or when the "good for" timer has expired (whichever comes first) the invention moves the process into a Spotting State (450) and a new spot timer begins counting down. The spotting phase provides for the investor to request a spot price for each traded item that requires the pricing of an underlying benchmark (items in the Done-ASC state) to ultimately determine the final dollar price of the traded security. The spot price may be set through an auto spot process as described in detail below or it may be set through some other spot process. After receipt of the spot price the list initiator acts by either accepting or rejecting the spot price.

Each Done-ASC line item where the spot price has been agreed to by the list initiator will move into a "Done-Awaiting Price Confirmation" (Done-APC) state or Pricing State (460). During this pricing phase, the list initiator is presented with the final dollar price for the spotted items. Once the list initiator agrees to the final price on each item, the trade moves into its final "Done" state.

Each Done-ASC item where a spot price has been requested but not received by the list initiator or where the list initiator chooses not to accept the provided price (does not act on the first or second final presentation of the spot price), then the list item will move into an "incomplete" state. All incomplete trades are priced manually in Pricing State (460) and final agreement is done over the computer system ultimately moving the trade into its final List Complete state (470). Once all items on the inquiry list are moved to either "Done" or "DNT-Did not trade", the inquiry list will then move to a "list complete" state (470).

Figure 5A:
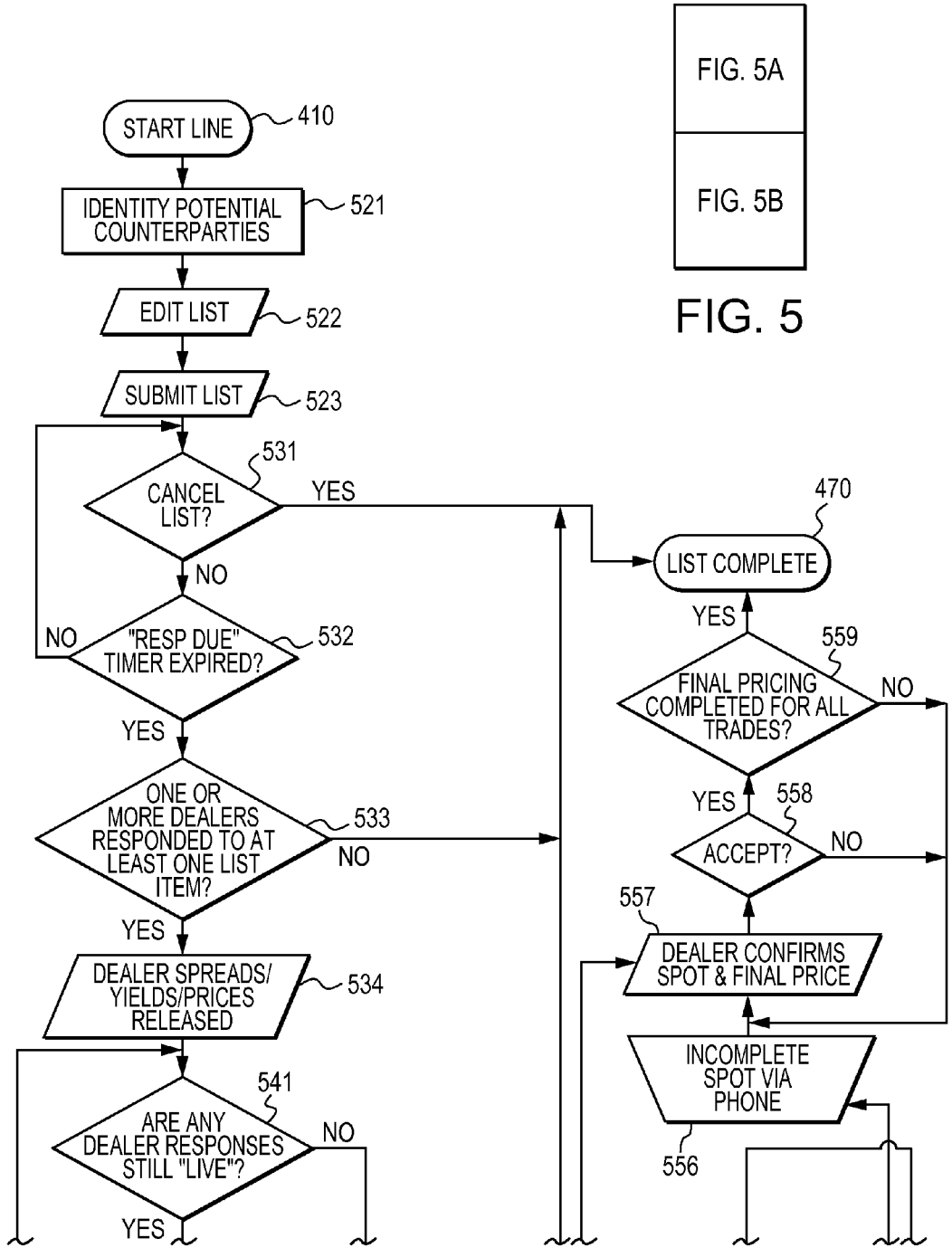
FIGS. 5A and 5B illustrates a detailed flow diagram of an inquiry list from its creation and continuing on through to its possible conclusions.
Figure 5B:
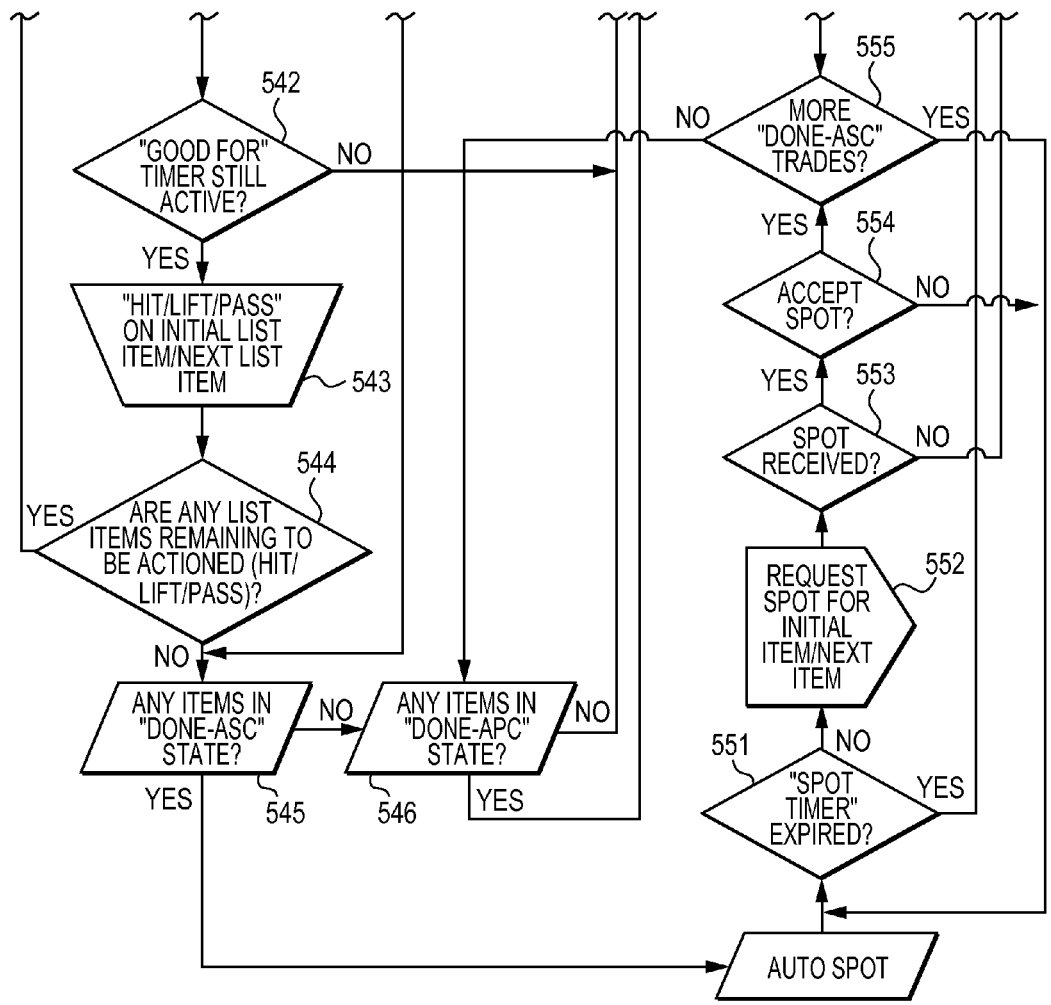
Figure 6:
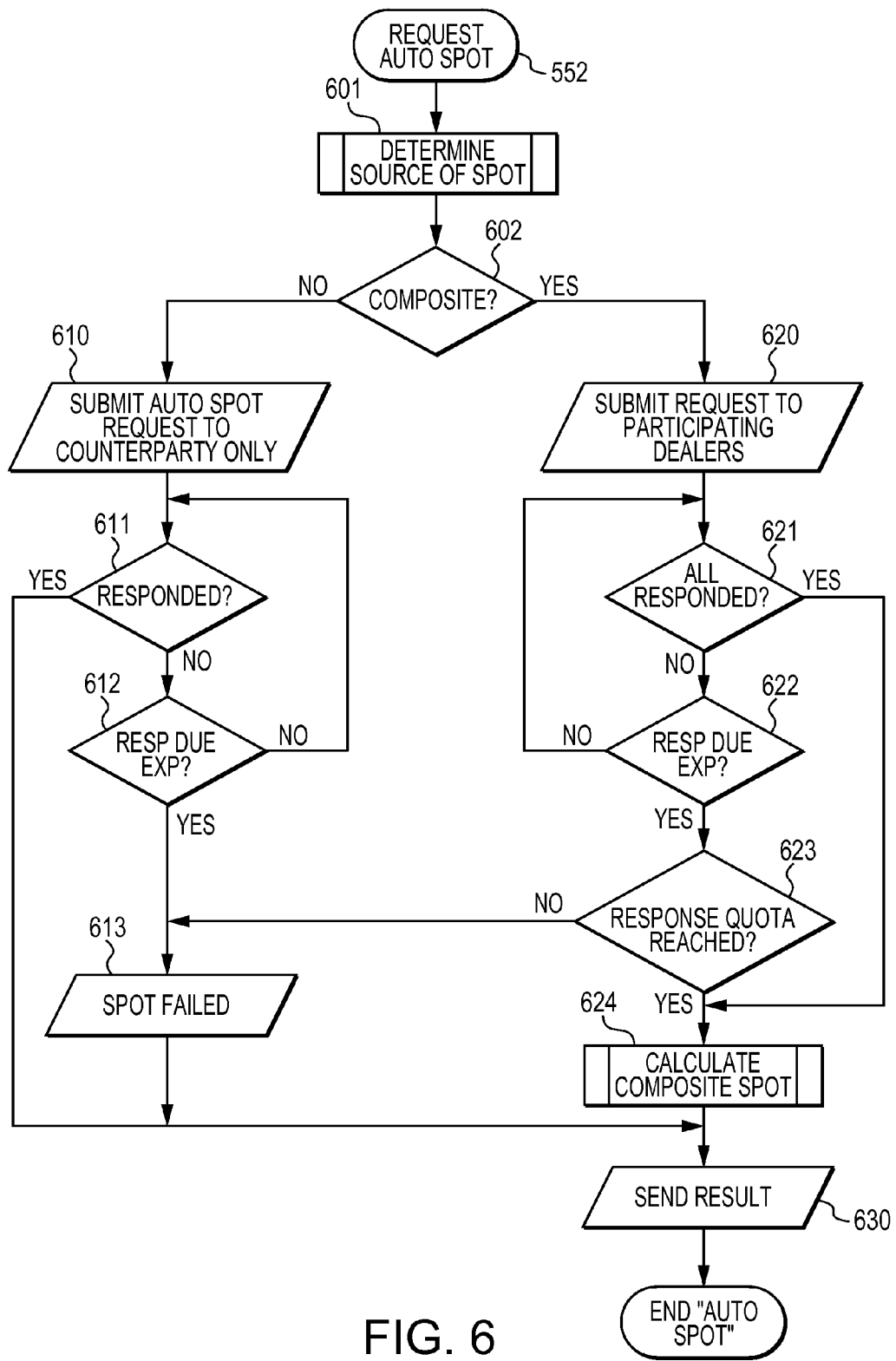
FIG. 6 illustrates a flow diagram of the auto spot process involved for each item on the inquiry list.

FIGS. 5A and 5B is a flow diagram illustrating a preferred embodiment of the process shown in FIG. 4 in somewhat more detail. Accordingly, the flow diagram begins with the Start List state 410 and ends with the List Complete state 470. In addition, FIGS. 5A and 5B includes various decision points and alternate flows depending on those decisions.

Steps 521-523 in FIGS. 5A and 5B correspond to Edit List State (420) in FIG. 4. These steps 521-523 as described below are merely a preferred implementation, and other steps may be utilized in other implementations.

At step 521, the client identifies potential counterparties for trading. The preferred embodiments of the invention enforce pre-defined relationships between list initiators and list recipients. When clients join the platform, they are required to provide documentation that lists the legal entities for which they want to be approved to trade with and the market segments and products for which they want to trade in. This information is passed on to the dealers who are on the platform. Dealers are then required to authorize a trading relationship for each client and client user on a product-by-product level. The preferred embodiments of the invention provide for a database to store and manage this information and for the instantaneous retrieval and enforcement by these relationships at the moment the client exits from the List Start State (410).

Step 511 permits the list initiator to select dealers where a pre-approved relationship exists. If a preauthorization does not exist between the client and dealer, then that dealer button will be unavailable to the client and the client will be prevented from selecting that dealer.

Step 521 enables the investor to control their distribution of counterparty credit risk across a number of counterparties. The credit of a large, highly credit worthy investor may exceed that of a given broker intermediary or the large investor may not wish the concentration of risk from settling with a single or few dealer intermediaries. For such an investor, there is a net reduction of risk by being able to select specific and multiple settlement counterparties.

At step 522, the client edits the inquiry list. Preferably, there are mandatory selections and optional selections. The mandatory selections may include selection of list type (bid or offer); selection of financial products; selection of size or volume for each product; selection of counterparties; selection of "response due" time; selection of "response good for" time; and selection of spot process. The optional selections may include selection to "cross" one or more items; change of default settlement date of products; change of default settlement date for benchmark (if crossing); revealing the number of recipients to all recipients; and entering of textual remarks. The completed inquiry list is submitted at step 523.

Steps 531-534 in FIGS. 5A and 5B correspond to the Due At State (430) in FIG. 4. These steps 531-534 as described below are merely a preferred implementation, and other steps may be utilized in other implementations.

At step 531, the system monitors whether the client has cancelled the list. If the client cancels the list, then the system transitions to the List Complete State 470. This monitoring continues until the "Response Due" timer expires at step 532. If the "Response Due" timer expires and the client has not cancelled the inquiry list, then the system checks whether or not one or more dealers responded to at least one item on the inquiry list at step 533. If no dealer responded, then the system transitions to the List Complete State 533. If at least one dealer responded, then the spreads/yields/prices are of the dealer(s) is released to the client at step 534.

Steps 541-546 in FIGS. 5A and 5B correspond to the Good For State (440) in FIG. 4. These steps 541-546 as described below are merely a preferred implementation, and other steps may be utilized in other implementations.

At step 541, the system checks whether any dealer responses are still live. If there are no live dealer responses, then steps 542-544 are bypassed. If there are live dealer responses, then the system checks to determine if the "Good For" timer is still active at step 542. If the "Good For" timer is not still active, then the system transitions to the List Complete State 470. If the "Good For" timer is still active, then the client chooses to hit, lift or pass on the initial item on the inquiry list or the next item on the inquiry list at step 543. Steps 541-543 are repeated until the system determines (step 544) that there is no item remaining on the inquiry list to be acted upon (hit/lift/pass). If there are any items on the inquiry list in the "Done-ASC" state (step 545), then the system moves to the auto spot step in spotting state 450. If there are no items on the inquiry list in the "Done-ASC" state, then the system checks to determine whether there are any items in "Done-APC" or "Incomplete" state at step 546. If there are no items in "Done-APC" or "Incomplete" state, then the system transitions to the List Complete state 470. If there are items in the "Done-APC" or "Incomplete" state, then the system transitions to the manual spotting part of the spotting state 450.

Steps 551-559 in FIGS. 5A and 5B correspond to the Spotting State (450) and Pricing State (460) in FIG. 4. These steps 551-559 as described below are merely a preferred implementation, and other steps may be utilized in other implementations of these states.

The spotting state 450 and pricing state 460 preferably have two parts: an auto spot process comprised of steps 551-555 and a manual spotting process comprised of steps 556-559. As mentioned above, the auto spot process is initiated when it is determined at step 545 that there are items on the inquiry list in the "Done-ASC" state and the manual spot process is initiated when it is determined at step 546 that there are items on the inquiry list in the "Done-APC" or "Incomplete" state.

At step 551 in the auto spot process, it is determined whether or not the "Spot Timer" has expired. If it has expired, then steps 552-555 are skipped and the process moves to the manual spot process (step 556). If the "Spot Timer" has not expired, then a spot is requested for the initial or next item on the inquiry list at step 552. (Details of a preferred implementation of step 552 are illustrated in FIG. 6 and described below.) At step 553, it is checked whether or not the spot is received. If the spot is not received, then it is checked whether or not there are any more "Done-ASC" trades (step 555). If the spot is received at step 553, then it is determined at step 554 whether or not the spot is accepted. If the spot is not accepted, then the auto spot process begins again at step 551. If the spot is accepted, then the process proceeds to step 555. If it is determined at step 555 that there are more "Done-ASC" trades, then the auto spot process begins again at step 551. If it is determined at step 555 that there are no more "Done-ASC" trades, then the process proceeds to step 546.

In the manual spot process, the dealer manually confirms the spot and final price at step 557. This may be carried out, for example, via phone. This confirmation step repeats until the spot and final price are accepted at step 558. The confirmation and acceptance steps 557 and 558 are repeated until the final pricing is completed for all trades (step 559).

Auto Spot

The embodiments of the invention can use manual and/or automatic spotting methods. The preferred embodiment illustrated in FIGS. 5A and 5B provides for both manual and automatic spotting methods.

If 'auto spot' is used as the method to spot, then all traded list items that require the spotting of an underlying benchmark will be priced on an automated basis. The automated spot process may occur when the list initiator, via a sender interface, requests from the system a spot price for the benchmark. The "auto spot" function utilizes an application programming interface (API) that allows the respondent dealer or the system to provide a spot price to the list initiator upon his request without human intervention. As one example, a system may be configured to use the "auto spot" feature when the following conditions exist: 1) the list initiator selects "auto spot" as the spot method when the list was originally sent; 2) the system value for "use auto spot" for that dealer=yes; 3) the inquiry size (quantity) for that line item is less than or equal to the system "auto spot" value set for that dealer; and 4) the dealer does not override the "use autospot" selection FIG. 6 illustrates an auto spot process that may be used in the example process of FIGS. 5A and 5B. Specifically, FIG. 6 shows an implementation of step 552 in FIG. 5A and 5B. Once it is determined that the "auto spot" method of step 552 will be used, the preferred embodiments of the invention determine the source of the auto spot price at step 601. This determination can be done in one of the following manners:

a) If the system value for "use own spot price" for that dealer=yes; then the invention will use the dealer provided benchmark price and present it to the list initiator (steps 611-613).

b) If the system value for "use own spot price" for that dealer=no; then the invention will provide a system-derived "composite" benchmark price and present it to the list initiator (steps 621-624).

The system determines at step 602 whether or not a composite benchmark spot price is to be provided. If the system determines that a composite benchmark spot price is not to be provided, then the auto spot request is submitted to a single counterparty only and steps 611-613 are performed. At step 611, it is determined whether the counterparty has responded. If so, the result is sent at step 630 and can be displayed to the dealer. If the counterparty has not responded, then at step 612 it is checked whether or not a response due timer has expired. If the response due timer has not expired, then step 611 is repeated. If the response due timer has expired, then the spot process is deemed to have failed (step 613). This result is also sent at step 630.

If the system determines at step 602 that a composite benchmark spot price is to be provided, then the system will submit the "auto spot" request to all participating dealers that have "contribute to composite price"=yes. A system-defined response due timer is started, and it is determined at step 621 whether all dealers have responded. If not, then the response due timer is checked to determine if it has expired at step 622, and step 621 is repeated until the timer has expired or all dealers have responded. If the timer expires before all dealers have responded, then it is determined at step 623 whether or not a response quota of a minimum number of dealers have been reached and responded with a spot price. If the response quota has not been reached, then the method proceeds to steps 613 and 630.

If the response quota has been reached and a minimum number of respondents exist, then a system-defined calculation is performed at step 624 to determine the composite price.

The composite spot price is then sent at step 630 and can be displayed to the list initiator.

Requesting Auto Spot for Multiple List Items

In further preferred embodiments of the invention (not illustrated), the list initiator is enabled to submit one auto spot request for all traded items that use the same benchmark. In the likely event that multiple traded list items use the same benchmark, the list initiator, rather then submitting individual auto spot requests, can streamline the spotting process by selecting this option. When this option is selected, the system will attempt to use one auto spot request to satisfy multiple traded items. After requesting one spot price for all list items that use the same benchmark, the system will check to see which of the dealers use the composite auto spot price. For all dealers that use the composite price, the system will retrieve and present one spot price to the list initiator. If accepted, the benchmark spot price will be used to price all of the traded items from those dealers using that benchmark. For dealers that do not use the composite spot price, the system will require the list initiator to request individual auto spots.

Regardless of the auto spot method used, after the list initiator selects "request spot", and a spot price is presented to the list initiator, the list initiator has a predetermined period of time (i.e., 10 seconds) to accept the price provided. If the list initiator does not act on the price within the allotted period of time, then the price presented is no longer valid. The list initiator can "request spot" a predetermined number of times. Each time the list initiator requests a spot for the predetermined number of times, a new spot price is provided via the auto spot function and a new timer begins to count down. The spot timer is a system configurable value that can be reduced or expanded as market convention dictates.

The "auto-spot" implementation allows the investor to request spot prices for multiple list items in one action, or in rapid succession, thus greatly reducing the time it takes to spot over the phone or by some other means. Whereas in prior art the spotting process for all traded list items could take many minutes or hours, the auto spot function of this invention allows for the same work to be completed in a manner of seconds. Therefore this auto-spot functionality adds a high degree of efficiency to the overall inquiry list process from both the investor and the dealer's perspective.

Presentation of Responses

Other features also add efficiency by allowing pricing to be handled in advantageous manner for a number of list items potentially being traded at or near the same time. In particular, a user interface is provided which facilitates the execution of multi-dealer, multi-issue trades via a single screen. These features streamline and automate the conventional process and add efficiencies by reducing the amount of time and number of errors.

All the best responses to the items on the inquiry list are presented to the user in a straight forward manner on one single screen. The user is presented with the "best" response to each item on one screen, and has the ability to easily display all of the responses to each item. The user can view details of each response in rapid succession as desired and then choose to either: 1) execute trades by "hitting" of "lifting" on the dealer responses, or 2) not execute trades by passing on the dealer responses—all from a single display screen until he has completed all the items.

In addition, the user interface makes it easy to display the "cover" (second best response) in conjunction with the best response. For example, the cover can be displayed to the client on the same screen as, and along side, the best response to each item on the list. This gives the client a quick point of reference with respect to the best response for each item on the list.

In the case where the list initiator executes with the dealer with the best response, then the following presentations may occur. The user interface may also display the cover to the dealer returning the best response for a list item after that list item has been hit or lifted. For every item where a dealer returned the best response, that dealer will be shown the value of the cover. The dealer is thus given a point of reference of his executed response (the best) with respect to the cover. In addition, for every list item, the dealer with the second best response ("cover") will be notified as such thus giving him immediate feedback as to the position of his response. Other respondent dealers are notified that the list item traded without any additional information.

The system does not prevent the list initiator from trading with respondents other than the dealer with the best response. In the case where the list initiator does not execute with the best response, then similar information is displayed to the best respondent and the executing respondent. For example, the user interface may also display the best response to the executing respondent of a list item after that list item has been hit or lifted. The executing dealer is thus given a point of reference of his response with respect to the best response. For every item where that dealer was the best response but the initiator did not trade the item with that dealer, that dealer will be notified as such thus giving him immediate feedback as to the position of his response. Other respondent dealers are notified that the list item traded without any additional information.

A variety of different user interfaces may be employed to implement these features. FIGS. 7 through 16 are example screen displays containing user interfaces for creating and submitting inquiry lists in accordance with a preferred embodiment of the invention. These screen displays and included user interfaces are preferably provided by a viewer software application installed on computer 230.

Preferably, interface 700 generated by the viewer application includes a plurality of high-level buttons or the like 701-707, which are displayed across all client screens, and specific information displayed pursuant to the process flow of a selected button is displayed below high-level buttons 701-707. Preferably, the currently selected high-level button is indicated on the screen, such as by highlighting the selected button or displaying the selected button in a color different than the other buttons. The high-level buttons offer different process flows to the functions of the system and do not necessarily provide mutually exclusive functions. In other words, it may be possible to perform the same function through a different sequence beginning with a different high-level button. The buttons 701-707 may be arranged in any manner. In the embodiment shown in FIG. 7, the "My Portfolios" button 705 is located to the right side of "Bid/Offer List" button 704, which in turn is located to the right side of the Trade button 703, and there is a space between the Inventory, ACTIVEs, Trade, Bid/Offer List, My Portfolios buttons 701-705 and the Activity and Blotter buttons 706 and 707. Inventory button 701 allows an investor to selectively view an available inventory of financial products that are being offered or bid on by dealers in the secondary (resale) market. The inventory contributions may be entered manually by the dealers at their respective interfaces, and/or imported from a database. The inventory accessed by inventory button 701 preferably contains indicative rather than executable prices (although both types of inventory may be present in the trading system). Indicative inventory refers to those financial products posted by a dealer along with the terms, such as the spread, with which they contemplate they might execute a trade for those financial products. The financial products may or may not actually ultimately trade at or near the indicated spread because of negotiation, competition from other dealers or other factors. On the other hand, executable inventory refers to financial products offered for trade as active bond issues accessible through active button 702 described below.

The investor may click on "actives" button 702 or the like to view offers and/or bids on actively traded securities. Instead of indicative inventory, actives button 702 accesses only the bonds in executable inventory which a dealer is willing to buy or sell and is firm with respect to the terms of those bonds. Therefore, actives button 702 is used for trade orders where there is no negotiation rather than simple inquiries with negotiated trading.

The investor may initiate an inquiry (which may or may not ultimately be used for a trade of a selected financial product) using the "trade" button 703 or the like. Preferably, an inquiry screen is initially displayed in response to the user clicking on trade button 703. Such an initial inquiry screen may have a field that allows a user to search for financial products, and various empty fields relating to a financial product (such as, Product, Rating, Issuer, Ticker, Coupon, Maturity, and/or Identifier) that are automatically populated and filled in as the user searches or otherwise selects financial products. The user manually fills in a size field with an amount that might be traded and selects a "Request Bid" radio button or a "Request Offer" radio button to submit an inquiry. The investor seeking to buy an issue will select "offers" to view the offer or selling terms of the dealers, while an investor seeking to sell an issue will select "bids" to view the bid or buying terms of the dealers. Moreover, while separate interfaces may be provided for offered and bid issues, it is possible to have a combined interface that lists both offered and bid issues. The selected financial product may not be in the inventory, or the user may not see a bond in inventory they are interested in buying, and may select trade button 703 to get a blank trade form or inquiry form to search for that bond. Thus, an investor (user) may use trade button 503 to submit an inquiry for a financial product which is contained in an available database, but not in an inventory accessed through inventory button 701.

Figure 7:
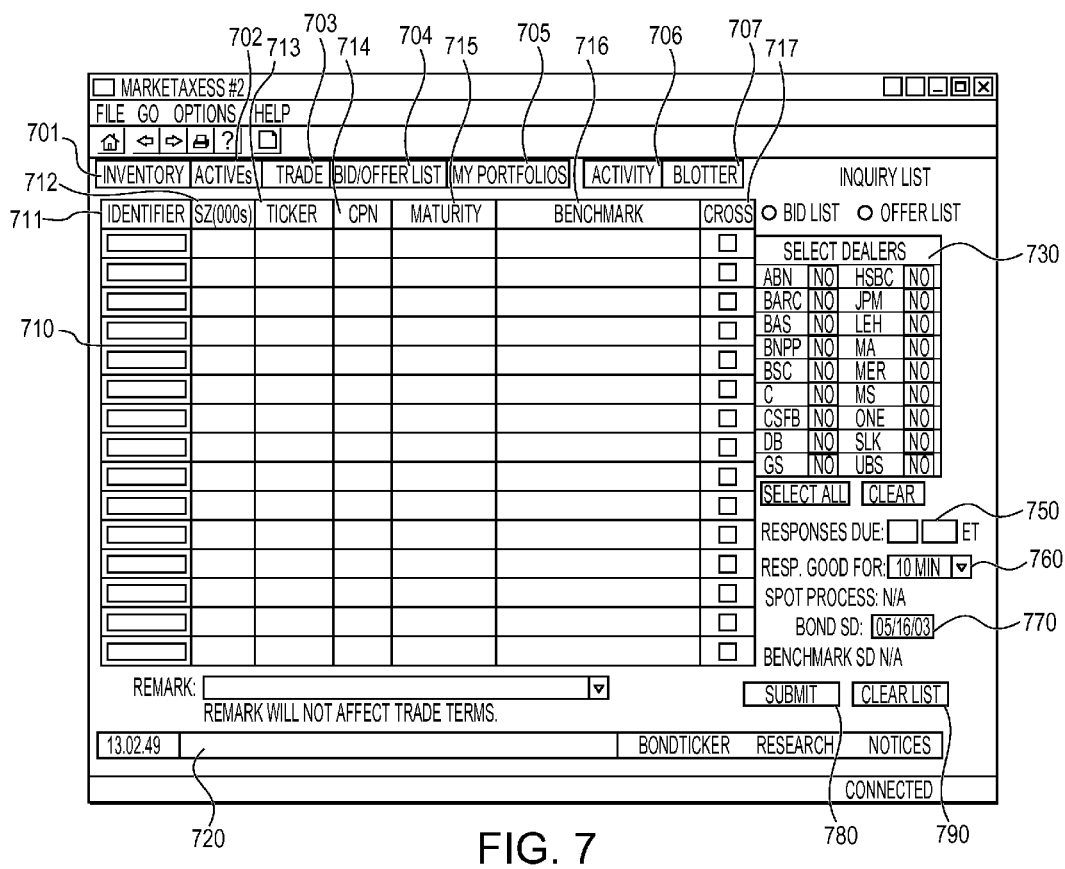
FIG. 7 is an example of a list initiator's blank initial inquiry list or inquiry list edit screen display according to a preferred embodiment of the invention.
Figure 10:
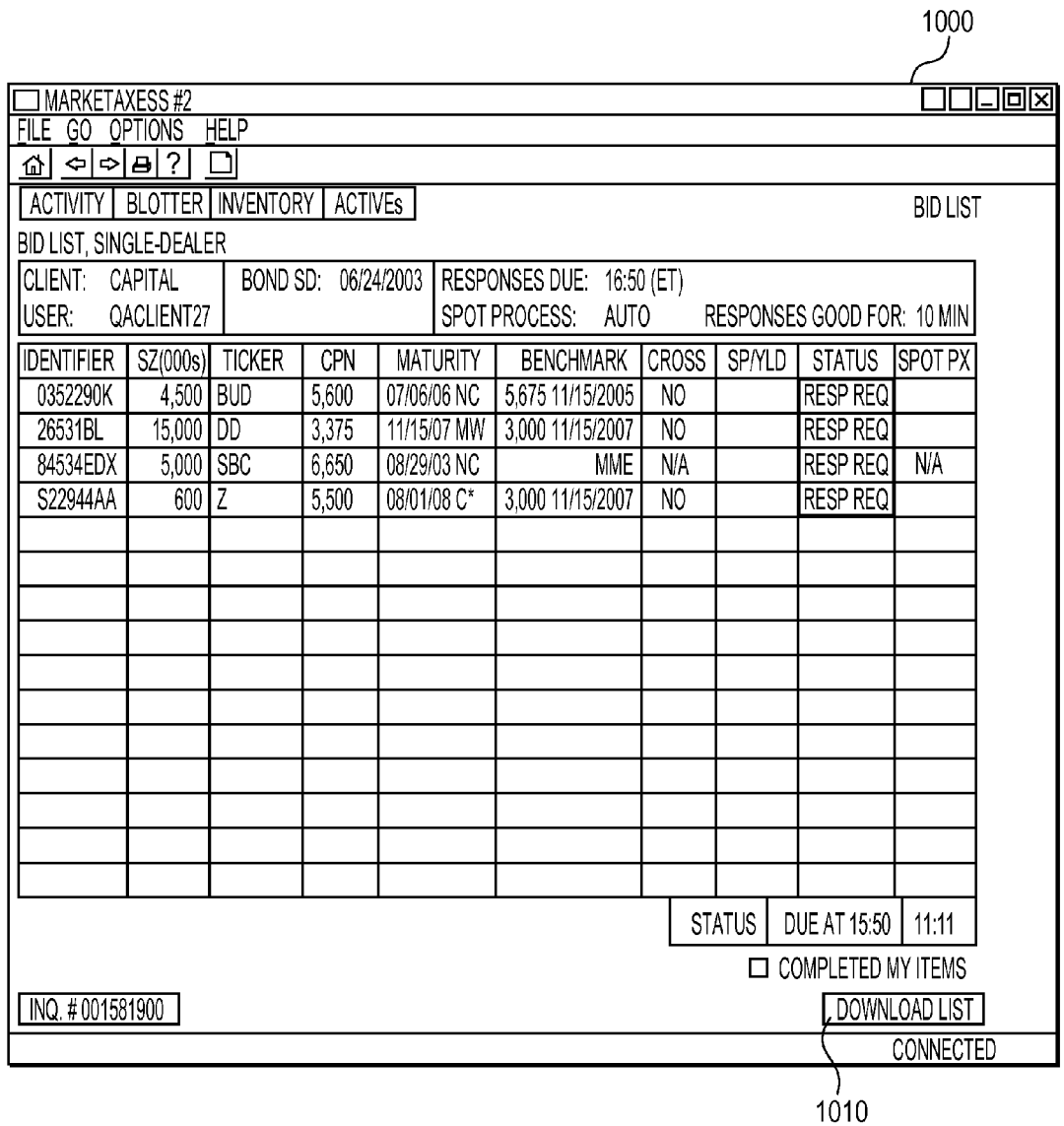
FIG. 10 illustrates an example of a dealer's (receiver of a list) inquiry list screen display in the electronic or electronic-assisted trading system according to a preferred embodiment of the invention.

Clicking on the "Bid/Offer List" button 704 will bring the user to an "Inquiry List" view, such as the Inquiry List view 700 shown in FIG. 7, which will allow them to create and submit the inquiry list. The screen may be set to default to Bid List or Offer List, with the client being able to override the default and choose a bid list or offer list by clicking on a Bid List radio button or an Offer List radio button, respectively. Alternatively, the system can be configured or configurable so that there is no default and the user must select either Bid List or Offer List before submitting a list. Bid and offer requests cannot be co-mingled on the same list. The name on the header of the Inquiry List view will change from Bid List to Offer List depending on the type of list selected by the user.

The Inquiry List view may have any layout. In the embodiment shown in FIG. 7, the items in the inquiry list are displayed in a grid 710 on the left side of the screen. The Bid List and Offer List radio buttons and the settings/choices for the selected bid or offer inquiry list are on the right side of the screen. Clients can create a bid/offer inquiry list with any number of issues up to the maximum number of lines offered in the grid. Preferably, the number of lines is configurable on a system wide basis, with a maximum of, for example, 16 lines.

There are seven column headings 711-717. A Ticker or a CUSIP (8 or 9 characters) is manually entered/edited by the user in Identifier column 711. (ISINs may also be supported in addition to or in place of CUSIPs.) The requested quantity is input in Sz(000)s column 712. The issuers' ticker symbol is provided in Ticker column 713. The issues coupon is provided in Coupon column 714. The maturity date of the issue, along with the P, C, NC and * indications as per current maturity displays are provided in Maturity column 715. The client selected benchmark is provided in Benchmark column 716. Any type of bond issue available on the trading platform may be comingled on the inquiry list grid 710 with any other type of bond issue available on the trading platform. For example, money market equivalent (MME) bond issues and non-MME bond issues may both be available, in which case, "N/A" will be displayed in the benchmark field for MME issues. (Money market equivalent bond issues are generally considered to be those issues having a maturity of 13 months or less.) Cross column indicates if the transaction will be versus a Treasury or an Outright transaction. The fields in Identifier column 711 are editable fields during the creation of the Inquiry List. The fields in Ticker column 713, Coupon column 714, and Maturity column 715 are not editable since the values in these fields will be dictated by the CUSIP entered in the field in Identifier column 711. The fields in the Sz(000)s column 712, Benchmark column 716 and Cross column 717 only become editable once the user enters a CUSIP into the Identifier column 711. However, for some bond issues (such as MME and FRN bond issues) the Benchmark column 716 and cross column 717 do not become editable.

Below the inquiry list grid 710 is a "Remarks:" drop down menu 720. A client can select one of a number of system defined remarks or manually enter their own remark. The list of predefined remarks preferably includes remarks specific to an inquiry list rather than a single issue inquiry. For example, the remarks may include "Liquidating Portfolio" or "May or may not trade all items".

Select Dealers Grid 730 is used by the client to select dealers to receive the inquiry list. The grid is preferably in a two column format, with dealers listed alphabetically starting in the left column going down and then moving to the right column going down. Select All and Clear buttons are also provided. If there are an odd number of dealers, the bottom right grid field can be left blank. Additional dealers can be inserted into select dealers grid 730 and the select dealers grid 730 can be moved down and condensed, as appropriate, to accommodate the expansion.

A "Reveal # of Dealers" checkbox, when checked, allows clients to show the dealers receiving the inquiry list the total number of dealers that were sent the inquiry list. This number will appear on the dealer's inquiry list pop up alert as well as on the dealer's inquiry list view. Preferably, Reveal # of Dealers checkbox appears only when two or more dealers are selected and defaults to unchecked which indicates that the user does not want to show the dealers receiving the inquiry list how many dealers are receiving the inquiry list. Preferably, the number of dealers that must be selected before the Reveal # of Dealers checkbox will appear is configurable on a system basis. FIG. 7 shows an empty inquiry list, and so the Reveal # of Dealers checkbox is not shown.

In "Responses due" field 750, the client enters the time that dealer responses to the inquiry list are due. Preferably, the hours and minutes will be blank and the response due times will be entered in military time according to the time zone indicated. Preferably, ASAP inquiries are not permitted and there is a configurable minimum time delay after the current time in which the responses must be due. Also, there is preferably a configurable time period for the response due times, such as, for example, between 900 and 1630 hours.

The user specifies the length of time they are requesting that the dealers honor their spreads through "Responses good for" drop down menu 760. Preferably, there is a configurable default such as, for example, 10 minutes, and the choices (5 min., 10 min., 15 min., etc.) in the drop down menu are configurable on a system wide basis.

FIG. 7 shows an empty inquiry list, and so the drop down menu is not shown. In the "Spot process" drop down menu, the client requests either an "Auto" or "Phone" spotting process. It preferably defaults to an "Auto" spotting process.

A Bond Settlement Date (Bond SD) field has the settlement date used for all corporate issues. Preferably, it is editable by the client and will default to T+3. A Benchmark Settlement Date (Benchmark SD) field has the settlement date for the Treasury leg of any cross. It will display "N/A" until the client has marked at least one issue as a cross trade. Once the client has checked the box in cross column 717 for at least one issue, the Benchmark date will be populated and default to T+1 in the format MM/DD/YYYY. The client will then be able to edit the Benchmark SD field and override the default date. The Benchmark Settlement Date will apply to all cross trades on the inquiry list, except for "When Issued" (WI) Treasury Benchmarks. The settlement dates for WI benchmarks will be the same as the instruments' issue date. The Benchmark SD field will display the correct settlement date (i.e. settlement date=issue date) on the individual inquiry screen for WI benchmarks.

Submit button 780 and Clear List button 790 are preferably provided at the bottom right of the Inquiry List view. When the client first enters inquiry list view 700, the Submit and Clear List buttons 780 and 790 will not be available and will be grayed out.

An activity log is not included in the initial Inquiry List screen, but it appears after the creation of an inquiry list. When the Inquiry List screen first appears, the cursor defaults to the first line of the identifier column. The user moves to the other fields of inquiry list grid 710 by clicking with a mouse on the desired field or pressing the <TAB> key to move the cursor to the next field to the right on the line in the sequence of Identifier column 711, Sz(000)s column 712, Benchmark column 716 and Cross column 717. Once the cursor gets to the field in Cross column 717, the next <TAB> will move the cursor down to the next line. When the user gets down to the last field of the last item on the list, the cursor will then return to the first line.

The creation of an inquiry list in inquiry list grid 710 is typically started by the user entering a Ticker or CUSIP in the first field of Identifier column 711 and pressing the <Enter> key. (Preferably, pressing the <TAB> key or clicking out of the field will not initiate a CUSIP search.) If an invalid Ticker or CUSIP is entered, the text "Error" will appear in Ticker column 713. Also, a pop-up error message will appear stating "No Bonds found for: <Ticker/CUSIP>" and will include an "OK" button. Clicking the "OK" button in the pop-up error message will return the user to the inquiry list view with the entered Ticker or CUSIP still displayed in the Identifier field. The user can then edit and resubmit.

The fields in Sz(000)s column 712 and Cross column 717 become editable once a valid Ticker or CUSIP is entered in the field in Identifier column 711. The field in Benchmark column 716 will initially display the algorithm defined Benchmark for all non-MME issues. However, the user can override the default choice and can select another Benchmark. For MME issues, the Field in Benchmark column 716 will display "N/A" and will not be editable. For FRN (Floating Rate Note) bond issues, the Field in Benchmark column 716 will display the benchmark rate and will not be editable.

If a valid CUSIP is entered, the fields in Ticker column 713, Coupon column 714 and Maturity column 715 will be populated. If a valid Ticker is entered in Identifier column 711, a Corporate List Box will pop up. The Corporate List Box will display all issues that match the entered Ticker. The user can then scroll the list and select the desired issue. Once the issue has been selected, clicking OK will insert this term on the line and display the CUSIP in the Identifier column 711, the Ticker in Ticker column 713, the coupon in Coupon column 714, and the maturity in maturity column 715.

A minimum number of items must be entered into inquiry list grid 710 before the Submit button 780 will become active and the inquiry list can be submitted. Preferably, Submit Button 780 is colored when it is active. Users are prevented from submitting inquiry lists with less than the minimum number of issues. If the user has the minimum numbers of items in the inquiry list grid 710 and then deletes one, the Submit button 780 will be grayed out again and inactive.

Preferably, the minimum number of items will initially be set to two (2), configurable on a system wide basis, and changes to the minimum number of items will not require a software release. Placing the mouse cursor over the Ticker, Coupon or Maturity of any issue will display a rollover tool tip, which will display the full issuer name for the security.

A user can modify a CUSIP at any time prior to submitting the inquiry list. In order to modify the CUSIP, the user navigates to the CUSIP in Identifier column 711, and edits the CUSIP as desired. Exiting the Identifier column 711, by pressing <Enter>, will again search for the bond and, if found, populate the fields in Ticker column 713, Coupon column 714 and Maturity column 715. The user is also able to edit the field entries in the Size column 712, Benchmark column 716 and Cross column 717 for this issue.

A user can also edit individual inquiry list items. The fields in Size column 712 are defaulted to blank. The fields in Benchmark column 716 will default to the system defined Algorithm benchmark (For MME issues, "N/A" will be displayed.) The user can choose another benchmark from the drop down list or "other". Fields in the "Cross" column are defaulted to "No." The check box will default to unchecked (unchecked indicates the issue is an Outright request), checking the box will indicate this item is a Duration Weighted Cross. A rollover tool tip will appear whenever the user rests the pointer anywhere on the Cross column 717. The tool tip will state "All Crosses are DW."

A user is also able to obtain details of individual issues once they have been entered in inquiry list grid 710. A menu appears if the user right clicks with a mouse on a field in the ticker column 713, coupon column 714, or maturity column 715. This menu will not appear if the user right clicks on a field in Benchmark column 716 or Cross column 717. One of the options in the menu is "Security Detail". Clicking one the Security Detail option will open a Security Detail pop up window.

A user is also able to delete CUSIPs prior to submitting the inquiry list. In order to delete a CUSIP, the user will navigate to the CUSIP in Identifier column 711 and delete the CUSIP. Exiting the blank Identifier column 711, by pressing the <Enter> key, will delete the entries in Ticker column 713, Coupon column 714 and Maturity column 715. The entries in the size column 712, Benchmark column 716 and Cross column 717 will also be blanked out for this issue. The inquiry list can be submitted with one or more blank rows and there is no requirement to re-sort the lines on the inquiry list in order to remove the blank rows.

Figure 8:
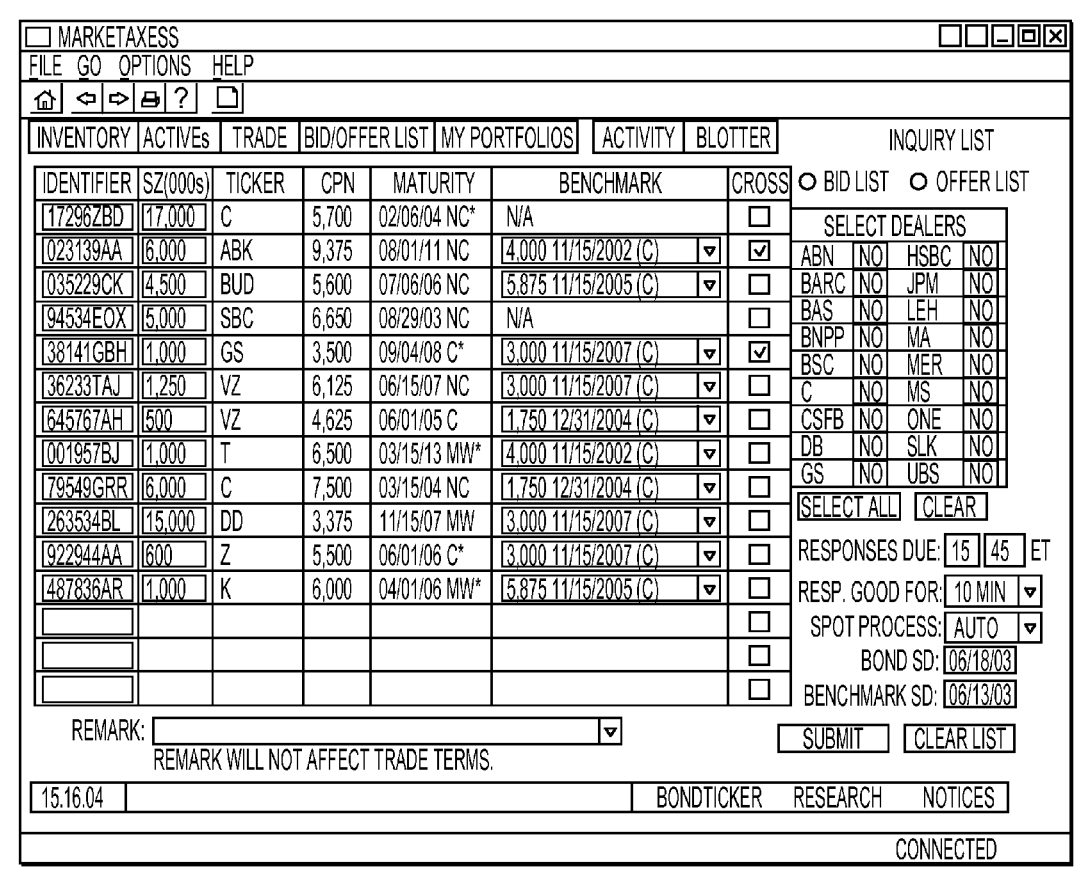

FIG. 8 shows an exemplary inquiry list with entries. The user can clear the inquiry list, save the inquiry list or submit it to dealers.

The user can clear the inquiry list after the grid is complete or at any time after the user has manually entered data in Identifier column 711 or any other place on the inquiry list, at which time the Clear List button 790 becomes active and colored. Clicking on Clear List button 790 will cause a Confirm Clear List pop-up message to appear asking the user to confirm that they want to clear the list. The pop up will preferably have two buttons: "Yes" and "No". Clicking "No" will return the user to the Inquiry List view and retain all the information previously entered. Clicking "yes" will return the user to the inquiry list view 700 with all items removed from identifier column 711, all remaining fields in inquiry list grid 710 set back to their default values and all settings, for the entire inquiry list, set back to their default values. Once the inquiry list has been cleared, Clear List button 790 will disappear and the Submit button 780 will be grayed out again.

At any time after a user begins creating an inquiry list, they can save it whenever they leave the inquiry list view (i.e., by clicking one of the high level buttons 701-704, responding to an inquiry/order alert pop up, logging off or experiencing a system failure). When the user returns to the inquiry list view, by clicking Bid/Offer List button 704, the saved inquiry list (including changes) will be viewable and editable changes. Each authorized user at each site will be able to save their individual changes. One user's changes will not impact another user from saving their changes. Only the user that made the changes will be able to see their previously saved inquiry list. Any other users opening an inquiry list will see either a blank/new inquiry list or their own, previously saved changes. The system may be configured or configurable so that changes will only be saved intra-day, an end of day processing routine will be executed to clear out any saved intra-day lists and changes will not be saved overnight. Alternatively, the system may be configured or configurable so that a user can save an inquiry list overnight and until the user again goes into their inquiry lists.

Once the inquiry list has been completed, the user can submit it to the selected dealer(s) by clicking Submit button 780 at the bottom of the Inquiry List Screen 700. Error checking will be done upon Client submission of the list. The following buttons or fields will require error checking and validation, preferably in the following order:

1) Bid/Offer radio button—One must be selected
2) Identifier—All valid CUSIPs have been entered.
3) Select Dealers—At least one Dealer has been selected.
4) Responses Due—Check that a time has been input, that the time is at least the specified minimum time from the current time and that it falls within the configurable window.
5) Sz(000s)—A size has been entered for each valid CUSIP.
6) Benchmark SD—A valid date has been entered.

If an error is found, the system will display an appropriate error message in an error message pop up. The error message will be one of the following (depending on the error):

"User must select Bid List or Offer List"
"Invalid CUSIP(s), please correct or delete!"
"Please select one or more dealers!"
"Please enter a 'Response Due' time!"
"Please enter a 'Response Due' time which is >15 minutes from the current time!"
"Invalid 'Response Due' time. Choose a time between 900 and 1630 (ET)."
"Please enter a valid Size for all CUSIPs!"
"Please enter a valid Settlement Date for the Benchmark Cross!"

The error pop up(s) have an OK button. Clicking the OK button will close the pop up and return the user to the inquiry list view 700. The user will then be able to correct the error and attempt to submit the list again.

If the user tries to submit an inquiry list and a "system error" occurs during submission, the list will still be sent. Any items that failed will display the text "FAILED" in the Status field with a black background. The activity log will display a message indicating there was a system error. If the system error can be traced to a particular item on the list, the identifier of the item must be specified in the activity log message.

Once all fields have been entered correctly and the client clicks Submit button 780, the system will perform a final check to see if the submitting user has another inquiry list outstanding with a Responses Due time that is within ½ hour before or after the submitted list's Responses Due time. If the user does not have another list outstanding that meets this criterion, then the client will receive an inquiry list confirmation pop up. If another list is found that meets this criterion, the user will receive a pop up warning message. The warning message pop up window will contain YES and NO buttons. Clicking the NO button returns the user to the inquiry list view with all fields still populated. Clicking the YES button will display a client confirmation pop up.

The client confirmation pop up preferably contains the following information: type of list (bid list or offer list); number of items on the list; amount—total value of the entire list; Responses Due time; Responses Good For time; Bond Settlement Date; Benchmark Settlement Date (only if one or more items on the inquiry list are marked as a cross); Remark—Yes or No; Spot process—either "Auto" or "phone"; Reveal # of Dealers—either Yes or No; and a list of the selected dealers. The confirmation pops up preferably includes the following messages: "Remark will not affect trade terms." (this message only appears when the client has included a Remark); "All Crosses are Duration Weighted" (this message only appears when the list contains one or more cross requests); and "All Corporate trades are assumed to be DTC settlement" (this message will always appear). (DTC is the acronym for Depository Trust Company.) The confirmation pop up contains YES and NO buttons. If the user clicks the NO button, they will be brought back to the inquiry list view in edit mode and the user will be able to edit all previously entered details as described above. If the user clicks the YES button, the inquiry list will be sent the dealers and the user will be returned to an inquiry list view with all items in the list displaying a "Pending" status.

An example display 900 for a pending inquiry list is provided in FIG. 9. Identifier column 711 of grid 710 and the containing overall inquiry list settings does not appear in this display. Benchmark column 706 is condensed by removing the drop down arrow, removing the space allotted for the current/old indicators, and shortening the maturity to just the month and year. Benchmark column 706 displays a rollover tool tip when the user places the mouse cursor over it. The tool tip will display the "full" Benchmark in the format: 'UST 5.375 May 15, 2015'. Cross column 707 displays "No" for outright inquiries and "DW" for Duration Weighted Cross inquiries. DLR column 901, Sp/Yld column 902, Cover column 903, Status column 904 and Spot Px column 905 are added to inquiry list grid 710. DLR column 901 displays "X"/"Y" for each item on the list. The "X" indicates the number of dealers that have submitted a response to the holding bin (either a level or a pass) and the "Y" indicates the number of dealers that received the inquiry list. The "X"/"Y" column 901 updates dynamically as dealer responses are received into or withdrawn from the holding bin. The status column 904 displays "Pending". The Sp/Yld column 902, cover column 903, Spot PX column 905 will not display any information until after the "Due At" time has been reached.

The responses due field 750 is changed from an editable field in inquiry list display 700 to a single field in pending inquiry list display 900 and preferably moved to the bottom right hand corner. Once the response due time is less than one hour, the responses due field 750 displays a countdown timer that begins counting down 59:59. If a remark was entered in drop down menu 720, it is displayed below inquiry list grid 710, preferably along with a disclaimer "Remark will not affect trade terms." The pending inquiry list display 900 does not include select dealers grid 730, reveal # of dealers checkbox, responses due field 750, responses good for drop down menu 760, spot process 770, submit button 780, or clear list button 790.

The inquiry number assigned to the inquiry list in inquiry list grid 710 is displayed below inquiry list grid 710 along with a "View Details" button 910, "Cancel List" button 920, and "New List" button 930. An activity log 940 is displayed at the bottom of the screen. It is preferably condensed to only display the number of lines accommodated by the screen requirements. Activity log 940 only affects inquiry lists and does not impact the activity log displays for any other inquiries. The system time, the number of items in the inquiry list, and the total quantity of the items in the inquiry list are also added at the bottom of display 900.

View Details button 910 launches a "Bid/Offer List Detail" pop-up window. This pop-up window preferably contains the same information contained in the Submit List confirmation pop-up described above, except that the query "Submit List?" and YES and NO buttons are replaced with a single CLOSE button. When the user clicks on the CLOSE button, it returns the user to the Bid/Offer List view.

Figure 16:
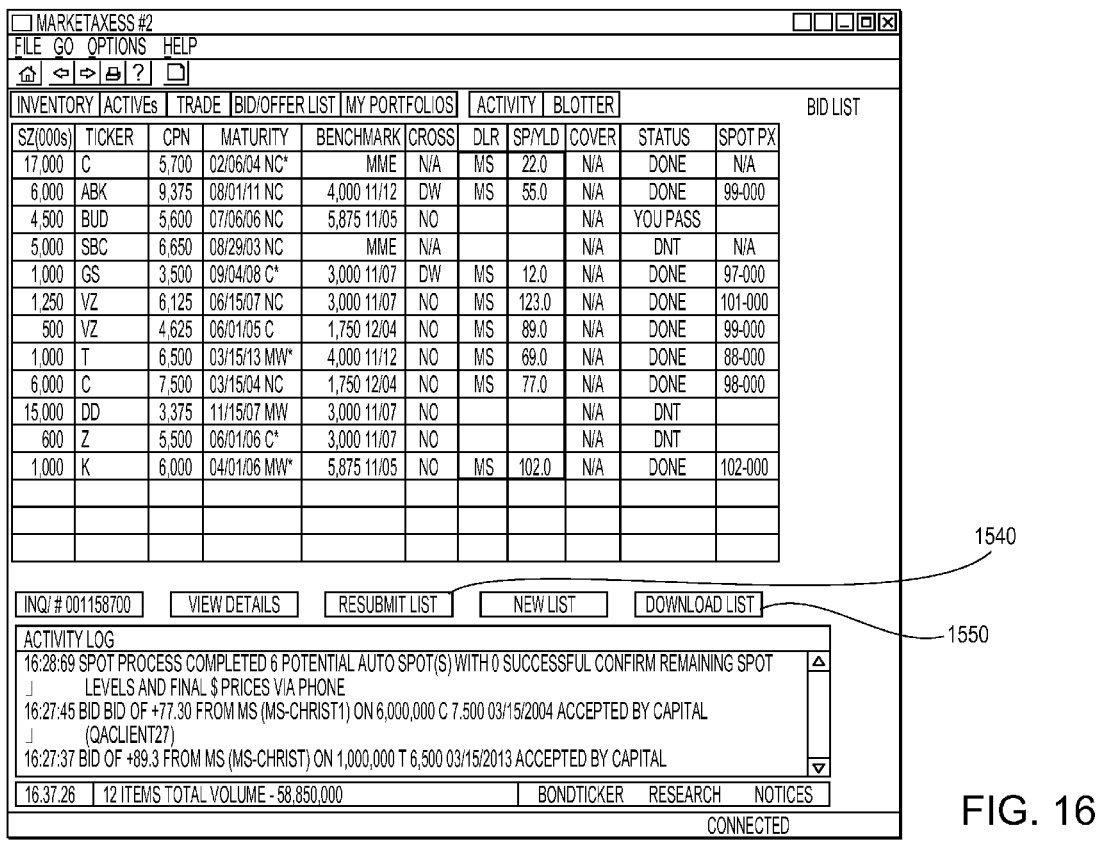
FIG. 16 is an example of a list initiator's inquiry list screen display after a list is completed according to a preferred embodiment of the invention.

Cancel List button 920 allows the user to cancel the entire inquiry list. Clicking cancel list button 920 causes a confirmation pop-up to appear. The header of the pop-up window preferably states "Confirm Cancel List." The pop-up preferably asks "Are you sure you want to cancel this Bid (or Offer) List?" along with "Yes" and "No" buttons. Clicking the No button will return the user to the inquiry list view. Clicking the Yes button will cancel the inquiry list and return the user to the inquiry list view with the status messages changed to "You Cancel" or "You Cxl". Dealers will see the status of their inquiry list change to "Client Cancel" or "Client Cxl". Canceling the entire inquiry list will generate the Activity Log message: "HH:MM:SS<Client><UserID> has canceled the Bid (Offer) List." This message will appear on the client's inquiry list activity log, on each of the client's individual inquiry activity logs, and on each of the dealer's individual inquiry activity logs. The user can resubmit a "dead" (i.e., cancelled) inquiry list. Preferably, the button to resubmit a dead inquiry list appears and is only available when the inquiry list becomes dead. FIG. 16 shows the screen that is displayed when a list is done, which includes a "Resubmit List" button 1550.

If a user wants to cancel individual item(s) on the inquiry list rather than the entire inquiry list, then they click on the line for the item(s) and open the item(s)'s individual inquiry. Cancelled item(s) will have their status changed to "You Cancel" or "You Cxl" on the user's inquiry list view and "Client Cancel" or "Client Cxl" on the dealer's inquiry list view. Once an item is cancelled, the user's inquiry list activity log will display the message: "HH:MM: SS<Client><UserID&- gt; has canceled the request for <quantity><Ticker>, <Coupon>, <Maturity>." Once an item is cancelled, the user and dealers individual inquiry view activity log will display the message: "HH:MM: SS<Client><UserID> has cancelled this inquiry. Preferably, users can also resubmit "dead" individual inquiry items from an inquiry list by clicking on the "dead" item to view the Activity Detail and selecting the "Resubmit Inquiry" button or right clicking on a "dead" item and selecting "Resubmit Inquiry" from the drop down menu. This functionality preferably resides outside of the inquiry list functionality. Any resubmitted items from an inquiry list will be treated as a regular single issue inquiry submission.

New List button 930 in pending inquiry list display 900 allows a user to create another inquiry list. Clicking on New List button 930 opens up a new, blank inquiry list view such as that shown in FIG. 7. (If a user is not viewing the pending inquiry list display 900, they can click on high level Bid/Offer List button 704.). Users can always return to pending inquiry list display 900 or "Resp Req" inquiry list by selecting the inquiry list line item from the activity console.

Preferably, users will have the ability to download dealer responses to the inquiry list. The information could include the details of the inquiry list along with each dealer's response. This ability could be provided, for example, by a "Download List" button. Preferably, the Resubmit List button 1550 and the Download List button 1560 appear to the user only at specific points in the process, such as after the auto spot process has been completed as shown in FIG. 15. A Download List button 1560 may also appear to the dealers at different points in the process, such as before and up until the Due In time has been reached. Preferably, users can also view additional information on dealer responses (IN, OPN, P) by clicking on a specific individual item in the inquiry list grid 710 at certain times in the process, such as before the Due At time.

Users can also right click on any individual item in the inquiry list grid 710 in the pending inquiry list view 900 to display a down drop menu with two choices: "Inquiry Details" and "Security Details." Clicking on "Inquiry Details" opens the inquiry view for that individual item.

Right clicking on an item which has a status of "You Cancel" or "You Cxl" will display a drop down menu with the choices: Inquiry Details, Resubmit Inquiry, and Security Details. Selecting "Inquiry Details" will open the activity detail for the item and the user can resubmit the inquiry. Selecting "Resubmit Inquiry" will open a single-issue inquiry window and allow users to submit this inquiry as a single-issue inquiry. The resubmitted, single issue inquiries have no connection to the inquiry list. Selecting "Security Details" will open up a window that lists all of the bond attributes, such as CUSIP, coupon, issue date, issuer, etc.

When an inquiry list "Responses Due" time has been reached and the user has received at least one response from a dealer on an inquiry list item, the user will receive a single activity alert. The activity alert will state: "Dealer prices have been release for your: BID(OFFER) LIST". The activity alert will also include the type of inquiry (single or multi-dealer, with number of dealers in parenthesis), number of items, total amount of inquiry list, and responses due at time. The activity alert pop-up will have the query "View Responses?" with YES and NO buttons. Clicking the NO button will close the popup and return the client to their previous application. Clicking the YES button will bring the user to their inquiry list view screen and display the dealer's responses. If the inquiry list has failed to receive any responses from any dealers, the client will not receive a pop up alert.

FIG. 11 shows an exemplary inquiry list display 1100 after the "Responses Due" time is reached. The "View Details" button 910, "Cancel List" button 920, and "New List" button 930 of pending inquiry list view 900 are not included in display 1100 or in displays during the subsequent accepting/passing and spotting phases. (However, "View Details" button 910 and "New List" button reappear, along with other buttons, after the spotting phase is completed as shown in and described below with respect to FIG. 15.) Instead of a "Responses Due In" timer, display 1100 has a "Responses Good For" timer that counts down the "good for" time as specified by the user.

In inquiry list grid 710, the Sp/Yld column 902 displays the best spread (or yield) and the DLR column 901 displays the name of the dealer that provided the best spread (or yield). Both columns are preferably highlighted with a gray background to draw the user's attention to the best responses. The "Cover" column displays the cover spread (yield) (second best response) if there is any. There will be no indication in the cover column if the spread (yield) is spread to put/call/average life. If there is no cover on an item, this field will be displayed as "N/A". The status column will display either "Resp Req" with a colored background (if at least one dealer responded with a level on this issue) or "DNT" with a black background (if no dealers responded for an issue).

Display 1100 includes "HIT" (or "LIFT") and "PASS" buttons to the right of each item in inquiry list grid 710. The "HIT" button is displayed when the user has submitted a Bid list. The "LIFT" button is displayed when the user has submitted an Offer List. If there is a tie for best price, the Dealer Name column will display *** and an "OPEN" button will appear next to the "Pass" button instead of the "HIT" or "LIFT" button.

The user must open tied items to execute a trade. The user opens an items by either: left clicking on the line item; right clicking on the item and selecting "Open Inquiry" from the right click menu; or left clicking on the "OPEN" button. If the dealer with the best price cancels, the screen is updated to show the next best price and the new cover. The user's activity log on the inquiry list view will display the message: "HH:MM:SS Dealer responses have been released from the holding bin." This message will not be displayed in the activity logs of the individual inquiry views. The activity logs of the individual inquiry views will display activity log messages. If the inquiry list fails to receive any responses, the user's activity log on the inquiry list view will display the message: "HH:MM:SS Inquiry List Completed. No responses received."

Users can view all dealer responses for a particular inquiry by clicking on the inquiry line item. This will bring the client to the individual inquiry screen where the best eight responses will be displayed in the dealer response grid. Other dealer responses will be listed in the activity log of the individual inquiry screen. Users can Accept or Pass from the individual inquiry screen. The "COUNTER" button is removed for inquiry list items. The individual inquiry activity logs contain all messages related to that individual inquiry.

In display 1100, the right click options are: 1) Security Details; 2) Open Inquiry; 3) Hit (or Lift) (this choice appears only if there is one dealer with the best spread); and 4) Pass. Selecting Security Details will open the Security Details pop up window. Selecting Open Inquiry will open the individual inquiry screen for that issue. Selecting Hit (or Lift) will "accept" the spread offered by the best dealer (further details described below). Selecting Pass will pass all dealers for this item (further details described below).

If there is only one dealer with the best level for an individual item in the inquiry list, a user can accept the dealer's level by either: clicking on the "HIT" (or "LIFT") button to the right of the status column 904 or right clicking on the line item and selecting "HIT" or "LIFT" from the right click drop down menu. When the dealer's level is accepted by one of these two methods, an Acceptance Confirmation pop up window will open. The Acceptance Confirmation pop up will have "YES" and "NO" buttons. Clicking the "NO" button will close the pop up and return the user to inquiry list view 1100 with no execution on the individual issue. Clicking the "YES" button brings the user back to the inquiry list view screen 1100 with the status changed to "Done-ASC". If the bond issue is an MME or FRN bond issue, then the status is changed to "Done-APC" awaiting price confirmation because the spot step is skipped for these types of bond issues. (See the various entries in status column 904 of inquiry list grid 710 in FIG. 12 for examples.) The user is not permitted to counter a dealer's response to an inquiry list. Accepting a dealer's level will generate the following activity log message in the user's inquiry list activity log: HH:MM:SS<Bid/Offer> of <level> from <DLR> on <Size><Ticker>, <Coupon>, <Maturity> accepted by <Client><UserID>.

A user can also accept a dealer's level for an individual item even though it was not the best response. To do so, the user must open the individual item by left clicking on the individual item line or right clicking on the individual item line and selecting "Open Inquiry" from the right click menu. Once the individual item in the inquiry list is opened, the user will be able to see a predetermined number of the best dealers' responses in the dealer response grid. (If more than the predetermined number of dealers respond, those responses are displayed in the individual inquiry activity log.) The user may then execute the trade with any one of the best dealer responses displayed. If the user executes a trade with dealer other than the dealer with the best response, the inquiry list view 1100 will be updated to show the selected dealer's short name in DLR column 901, the agreed upon level in the "Sp/Yld" column 902 and the new cover level in the cover column 903 (in this case, the new cover will be the former best level). The inquiry list view activity log message will state: HH:MM:SS<Bid/Offer> of <level> from <DLR> on <Size><Ticker>, <Coupon>, <Maturity> accepted by <Client><UserID>—.

If two or more dealers are tied for the best response, the dealer column will display * to indicate that multiple dealers have responded with the best level. In this case, the HIT/LIFT button will not appear, instead an Open button will appear in its place. The user must open the individual item to execute a trade. They open the item by either: left clicking on the line item; left clicking on the OPEN button; or right clicking on the individual line item and selecting "Open Inquiry" from the right click menu. Once the user executes and confirms the trade, they are taken back to inquiry list view 1100. Inquiry list view 1100 is updated to show the selected dealer's short name in DLR column 901, the agreed upon level in the "Sp/Yld" column 902 and the new cover level in the cover column 903**.

Figure 13:
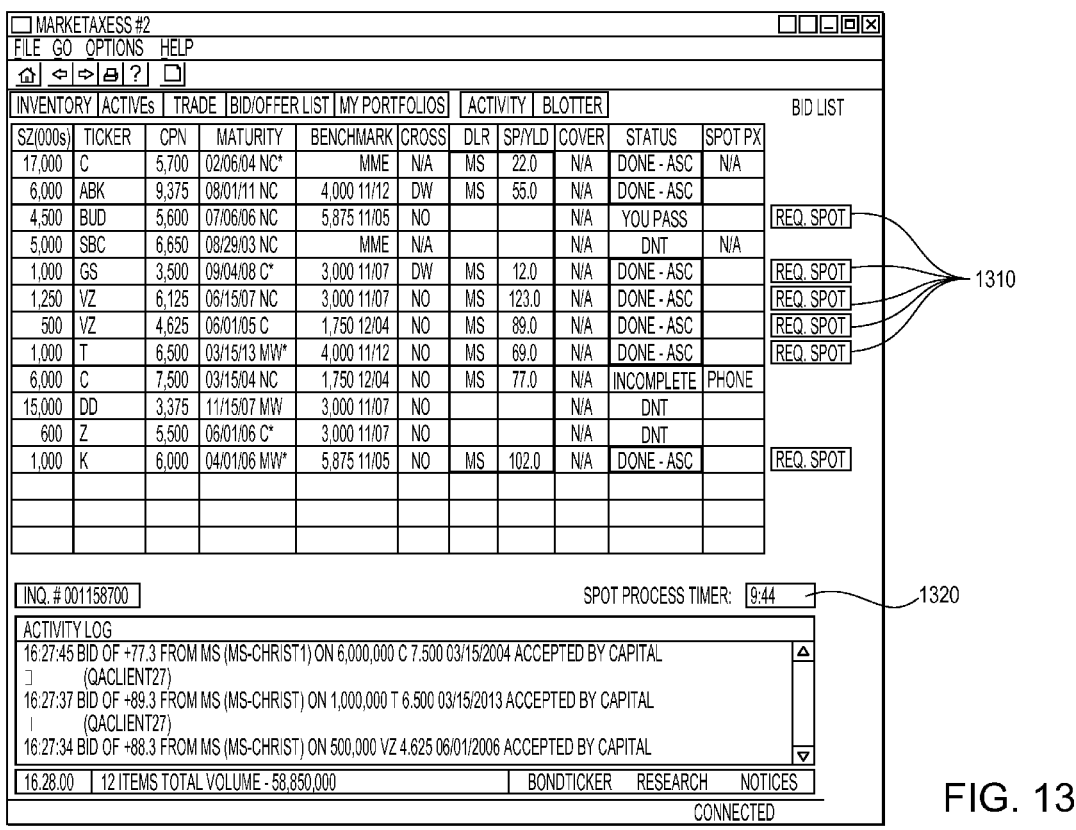
FIG. 13 is an example of a list initiator's inquiry list screen display during the spot process with a Spot Process Timer according to a preferred embodiment of the invention.

The user can also pass on any single individual issue in the inquiry list. This is done by either: clicking the PASS button to the right of the line item; right clicking on the line item and selecting "Pass" from the right click drop down menu; or opening the individual inquiry and selecting "Pass." In the first two cases, a "Confirm Pass:" pop up window will appear, which will state the issue which the user is passing and have YES and NO buttons to confirm the pass. An exemplary pop-up window 1310 is shown in FIG. 13. If the user clicks on the YES button, the item is passed, a pass notice is sent to all of the dealers that responded to that item, and the user is returned to inquiry list view 1100 with the status column 903 for that item stating the status as "You Pass." See, for example, FIG. 13. The user's inquiry list activity log will display the message: HH:MM:SS<Client><UserID> passes on <Bids/Offers> for <Ticker>, <Coupon>, <Maturity>. Clicking the NO button will not pass the item, but it will close the pop up and return the user to the inquiry list view. If the user passes in the third manner (by opening the individual inquiry and selecting "Pass"), then they can add Pass remarks.

If the user does not trade any items on the inquiry list, either because they have passed or the dealer(s) canceled their price(s) on each of the items on the inquiry list, then the inquiry list is dead. The user's inquiry list activity log will state: "HH:MM:SS Inquiry List Completed. No trades executed." If the user has accepted a trade for at least one of the items on the inquiry list, they will then enter the spotting process and the system will display a spotting process screen, such as the exemplary screen 1300 shown in FIG. 13.

Spotting process screen 1300 replaces the "Responses Good For:" timer with a Spot Process Timer 1320. The Spot Process Timer 1320 sets the time period for the spotting process. It starts counting down once the user has finished the entire inquiry list by trading or passing on each item. If the user has not finished the entire inquiry list when the "Responses Good For" timer expires, then Spot Process Timer 1320 will nevertheless start counting down when the "Responses Good For" timer expires. The Spot Process Time may be configurable on a system basis.

The status column 903 in spotting process screen 1300 will initially have the status of "Done-ASC", "You Pass" or "DNT" (Did Not Trade) for each item in inquiry list grid 710. The Spot Px column 904 will have "N/A" for those items that were passed or did not trade. The spotting process for each item in the inquiry list that was accepted for trade will have one of the following scenarios: 1) the user chose the "Phone" spot process; 2) the user chose the "Auto" spot process; 3) the user chose the "Auto" spot process and the dealer overrode the spot process to "Phone"; or 4) the user trades on an MME issue (which does not require a spotting process). The Spot Px column 904 in spotting process screen 1300 initially contains the text "Phone" for all of those items in scenarios 1) or 3). A "Req. Spot" button 1310 is displayed to the right of each individual item in inquiry list 710 that is in spotting process scenario 2).

The user clicks on each respective "Request Spot" button 1310 to receive a spot price from the trading system. Preferably, the spot price is delivered via the API discussed above with respect to FIG. 3. If a spot price is unavailable for an individual item, then Spot Px column 904 for that item will display the text "unavail". The user may click on "Request Spot" button 1310 a second time. If the spot price is still unavailable, then Spot Px column 904 will display the text "Phone" and "Req. Spot" button 1310 will disappear. If a spot price is received, the spot price is displayed in "Spot Px" column 904 with a yellow background. and the price will be good for a configurable length of time, for example, 15 seconds. An "Accept" button 1410 is displayed to the left of the item and a timer 1420 will count down a configurable length of time, for example 15 seconds, for the spotting process. Until the spotting process finishes, "Req. Spot" button 1310 for the other items will be grayed out and unactionable.

FIG. 16 shows an example display screen after an inquiry list is completed (and one or more of the items on the list did not trade). Preferably, the same buttons as shown in FIG. 15 remain in the display screen. Once the spotting process finishes and a final price is determined by the dealer, a final price alert is sent to the user advising him of the final price. The trading may proceed and be concluded exclusively electronically with no further action necessary by the user ("electronic trading"). Alternatively, the user and dealer may manually interact via telephone, etc., to confirm the process and the final price ("electronic-assisted trading). Even in the instance of electronic-assisted trading, the preferred embodiments of the invention still results in substantial time and cost savings to the user.

In accordance with the present invention, systems and methods for providing a price-based inquiry list are provided.

Figure 17:
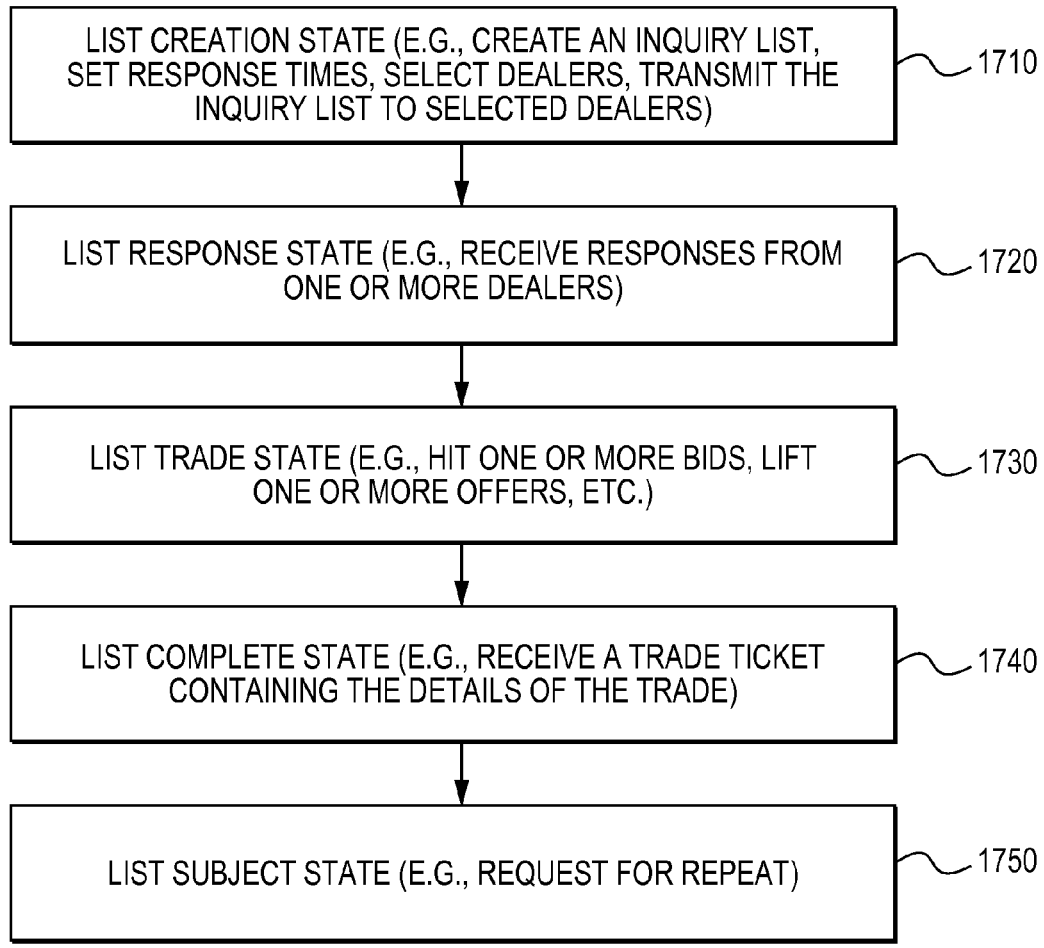
FIG. 17 is an illustrative flow diagram of the trading states for a price-based inquiry list in accordance with some embodiments of the present invention.
Figure 18:
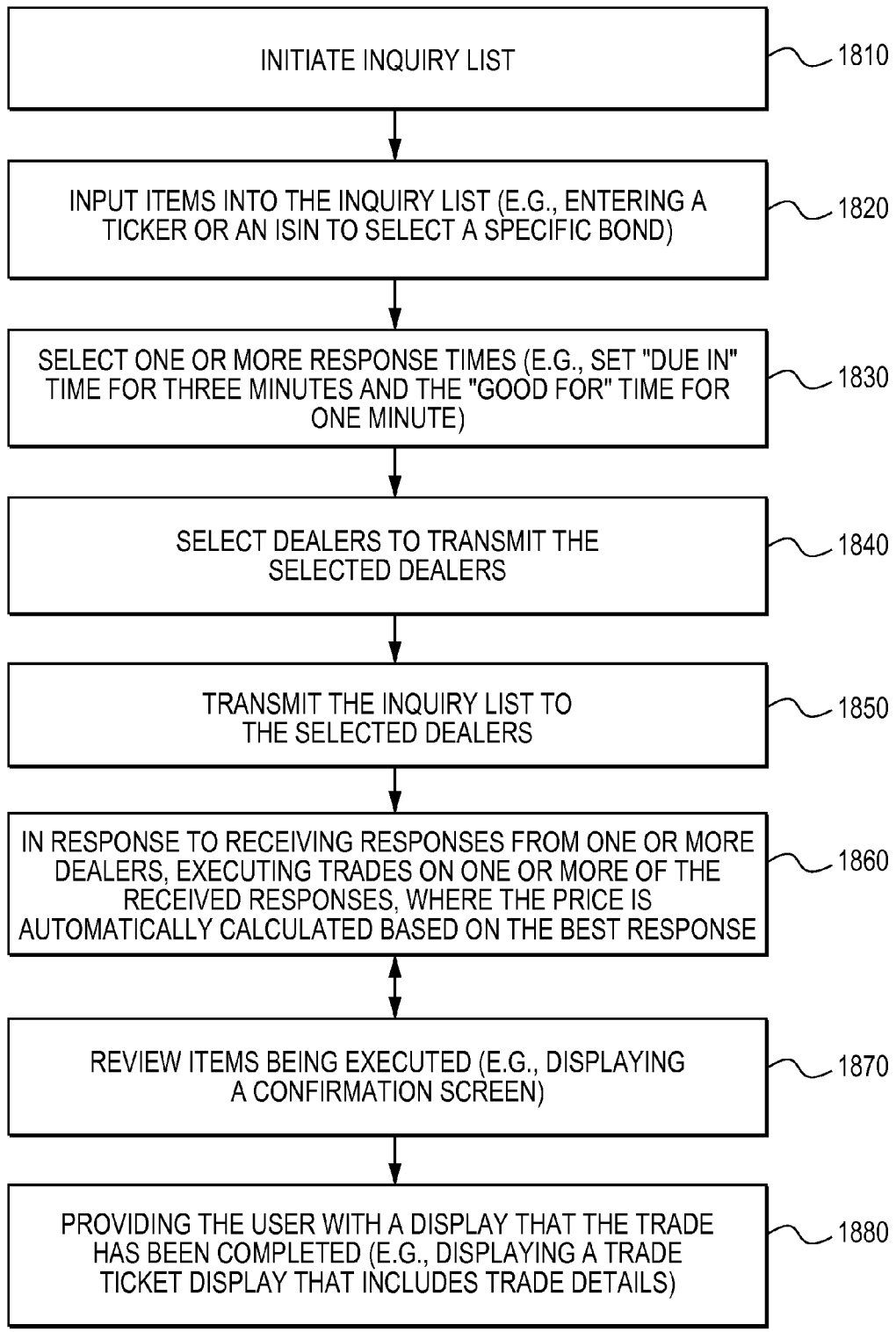
FIG. 18 is an illustrative flow diagram of the price-based inquiry list from creation to completion in accordance with some embodiments of the present invention.

Turning to FIGS. 17 and 18, simplified flowcharts illustrating the steps performed in creating and executing trades with a price-based inquiry list in accordance with some embodiments of the present invention. These are generalized flow charts. It will be understood that the steps shown in FIGS. 17 and 18 (and any other flowchart) may be performed in any suitable order, some may be deleted, and others added.

As shown in FIG. 17, the price-based inquiry list process begins with the list creation state (step 1710). For example, when the list initiator selects a "Bid/Offer List" option from a main view or any other suitable screen, the list initiator is presented with an inquiry list edit screen. Using the inquiry list edit screen or any other suitable screen, the list initiator may create a new price-based inquiry list, modify a list that was previously sent, modify a list that was previously created but not sent, etc. The list initiator may populate the inquiry list by, for example, selecting items from an instrument database provided by the system, selecting items from his uploaded portfolios, inputting a ticker in a ticker field, inputting an ISIN number in an identifier field, etc. For each item on the inquiry list, the list initiator may also enter additional information, such as the size or the amount that the list initiator would like to transact.

As described previously, the list initiator may select to transmit the price-based inquiry list to one or more dealers. Again, instead of relying on a central broker to maintain the anonymity of the buyer and seller, the preferred embodiments of the invention use a model where the potential counterparties (the list initiator and the dealer recipients) optionally have an established relationship or other predetermined or previous relationship or connection that does not require use of a central broker. Alternatively, in accordance with other embodiments of the invention, the use of a central broker is not used for parties and counterparties that do not desire to use such as mechanism. All inquiry list negotiations and trades are generally done without intermediation of a third party, although in some embodiments and intermediary third party may optionally be used. The buyer and seller of each instrument or item are fully known to each other throughout the trading process.

The list initiator may also select a "due in" time and a "good for" time. Responses are sent to the list initiator during the response due in time. The list initiator can see the number of respondents, but all responses are kept in a "holding bin" and are not released or visible to the list initiator until the due in time has expired. When the "due in" time expires, the "good for" timer begins to count down In response to, for example, creating the price-based inquiry list, selecting one or more dealers to transmit the list, and select "due in" time and "good for" time parameters, the list initiator may submit the list. In response to submitting the inquiry list, the price-based list process advances to a list response state (step 1720).

Dealers that receive the list may be alerted that a list has been received. When the recipient opens the list, that recipient may submit one or more responses to one or more of the items on the price-based inquiry list. Responses are then sent to the list initiator during the response due in time. The list initiator can see the number of respondents, but all responses are kept in a "holding bin" and are not released or visible to the list initiator until the due in time has expired.

In some embodiments, an indicator, such as an alert or a reminder, may be provided to each respondent (or list recipient) to inform the respondent that the prices (responses) inputted in response to one or more items on the list will be released to the list initiator at a given time and that the respondent has an opportunity to review the list and the inputted prices. An alert or any other suitable indicator may be provided to each respondent at a given time prior to the expiration of the "due in" timer (e.g., one minute, five minutes, thirty seconds, or any other suitable time). For example, a respondent may be provided with an alert one minute prior to the "due in" timer expiring. The alert may inform the respondent that, for example, the one or more responses and prices inputted by the respondent will be released to the list initiator upon the expiration of the "due in" timer.

In some embodiments, the alert may also prompt the respondent with questions, such as "Do you want to review the list?" The alert may provide the user with a suitable interface, such as "Yes" and "No" buttons. In response to the respondent selecting the "Yes" button, the respondent may be provided with a list response screen or any other suitable display that allows the respondent to review the inputted responses (e.g., prices) and allow the respondent to adjust the responses. Alternatively, if the respondent selects the "No" button, the alert may terminate or close.

When the "due in" timer expires, the process enters the list trade state (step 1730). In the list trade state, the "good for" timer begins to count down and responses to items on the inquiry list are presented to the list initiator. For example, the list initiator may be presented with the "best" response to each item (e.g., the highest bid, the highest offer, etc.) on the inquiry list. The responses from the respondents or dealers may be sorted and the highest response for each item may be displayed to the initiator on the inquiry list. Alternatively, the list initiator may be presented with the "best" response and the "cover" (second best response) to each inquiry displayed on the same screen and along side each other. The list initiator may pass (elect to not trade) on one or more of the responses. The list initiator may execute trades by "hitting" or "lifting" the responses submitted. The list initiator may perform this in rapid succession until the list initiator has acted on all the items or until the "good for" time has expired. The items that are passed on by the list initiator (not traded) will go into a DNT (Did not trade) state. The items that are traded (by hitting or lifting) advance to "Done" or list complete state (step 1740). No further action is required by the list initiator or recipient to complete the trade in at least one embodiment. For example, in response to executing trades on one or more of the items in the inquiry list, the list initiator may be provided with a confirmation display including details of the trades.

In some embodiments, when the "good for" time expires, the "Subject" grace timer begins to count down in a subject state (step 1750). While the subject grace timer counts down, the list initiator may act on any remaining items that were not acted on in the Good for State by, for example:

1) The list initiator may pass (elect not to trade) on one or more of the items. Items that are passed on by the list initiator enter a DNT (Did Not Trade) state.

2) The list initiator may attempt to execute trades on one or more items by "requesting a repeat" of those items' best initial responses.

By requesting a repeat of the best initial response to a list item, the list initiator is performing the following:

Committing to the best initial response provided by a list recipient.

Asking the list recipient who previously provided the best initial response if that list recipient would still like to trade the list item on the initial response.

In some embodiments, one or more of the following constraints may apply when requesting for a repeat:

The list initiator may only request a repeat from the list recipient who provided the best response (e.g., the highest bid, the highest offer, etc.). If there is a tie for best initial response, the list initiator chooses one of the tied for best list recipients from whom to make the request to repeat.

The list initiator may only make a request for repeat of a list item's best initial response while the subject grace timer is counting down.

The list recipient who receives the request for repeat may respond to the request only while the subject grace timer is counting down.

The list initiator may make only one request for repeat per list item. Multiple requests for repeat on a single list item are prohibited.

The list initiator and the list recipient who receives the request to repeat cannot negotiate on the list item's initial response.

In some embodiments, the list initiator may request a repeat by, for example:

Highlighting the list item on the list main screen and clicking a button identified "Req Repeat."

Highlighting the list item on the list main screen, right-clicking, and choosing the "Req Repeat" option from the right-click menu.

Double-clicking the list item from the list main screen and clicking the "Req Repeat" button on the resulting list item's individual response screen that appears.

When the list initiator requests a repeat from the list recipient that provided the best response, the list recipient may be provided with a pop-up window or any other suitable indication. The list recipient may respond to the request while the subject grace timer is counting by, for example:

Accepting the request for repeat and trade the item. This traded item will then enter the Done state.

Declining the request for repeat. The item does not trade and enters into a "Dealer Declined" (which may be displayed to the user as "Dlr Declined") state. The "Dealer Declined" state is a display state. In response to a dealer or respondent declining the request, the system enters into a DNT (Did Not Trade) state.

Not responding at all and allowing the subject grace timer to expire. The item does not trade and enters into a DNT (Did Not Trade) state.

When the list recipient receives the request for repeat from the list initiator, the list recipient may accept or decline the request by, for example:

Hitting or selecting the "Accept" or "Decline" buttons or other suitable user interfaces on an alert pop-up or other display indicating the request for repeat.

Double-clicking on the list item from the main list screen and hitting the "Accept Repeat" button or "Decline Repeat" button on the resulting list item response screen.

When the subject grace timer expires, items that have not been acted upon by the list initiator or list recipient will go into the DNT (Did Not Trade) state.

Figure 19:
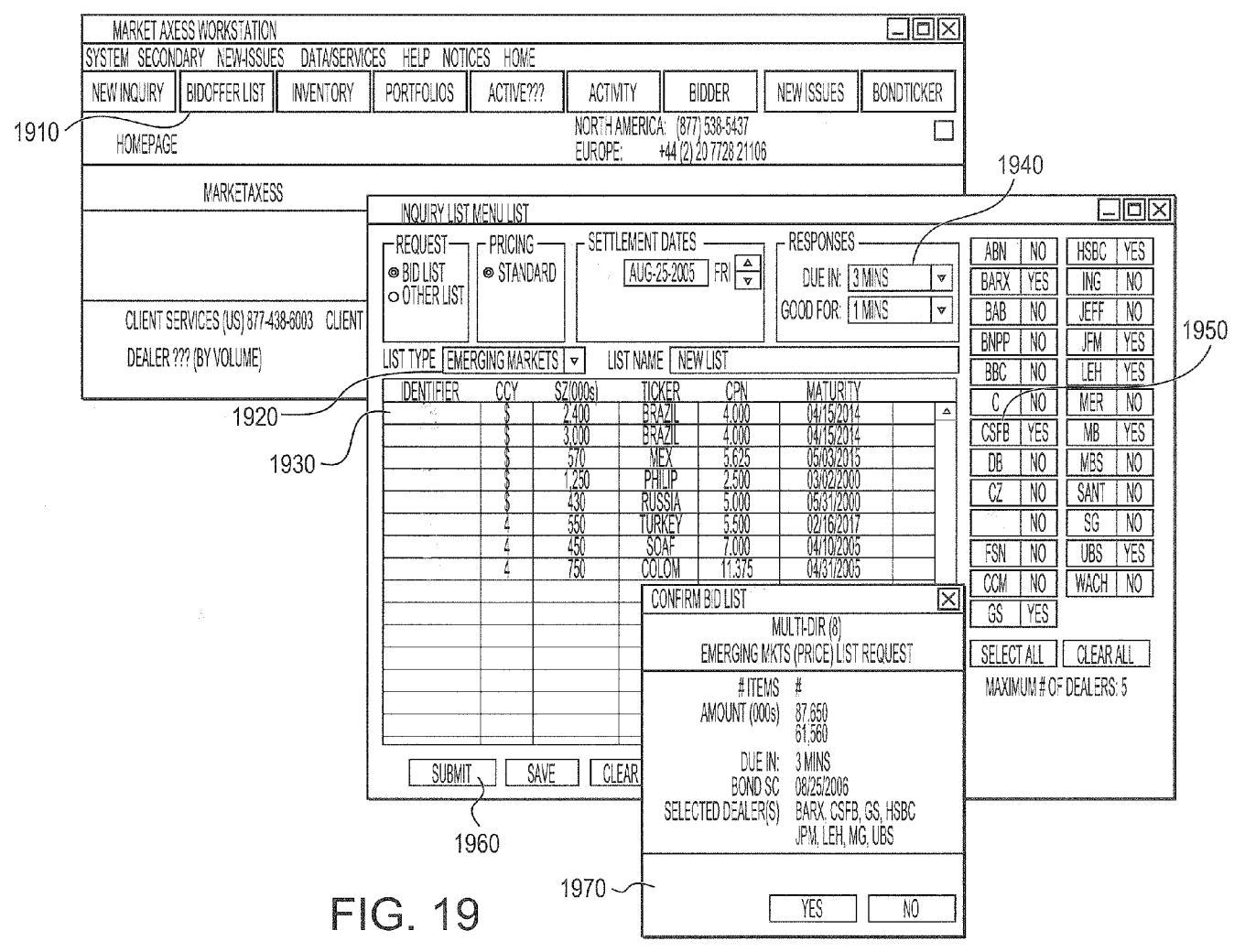
Figure 20:
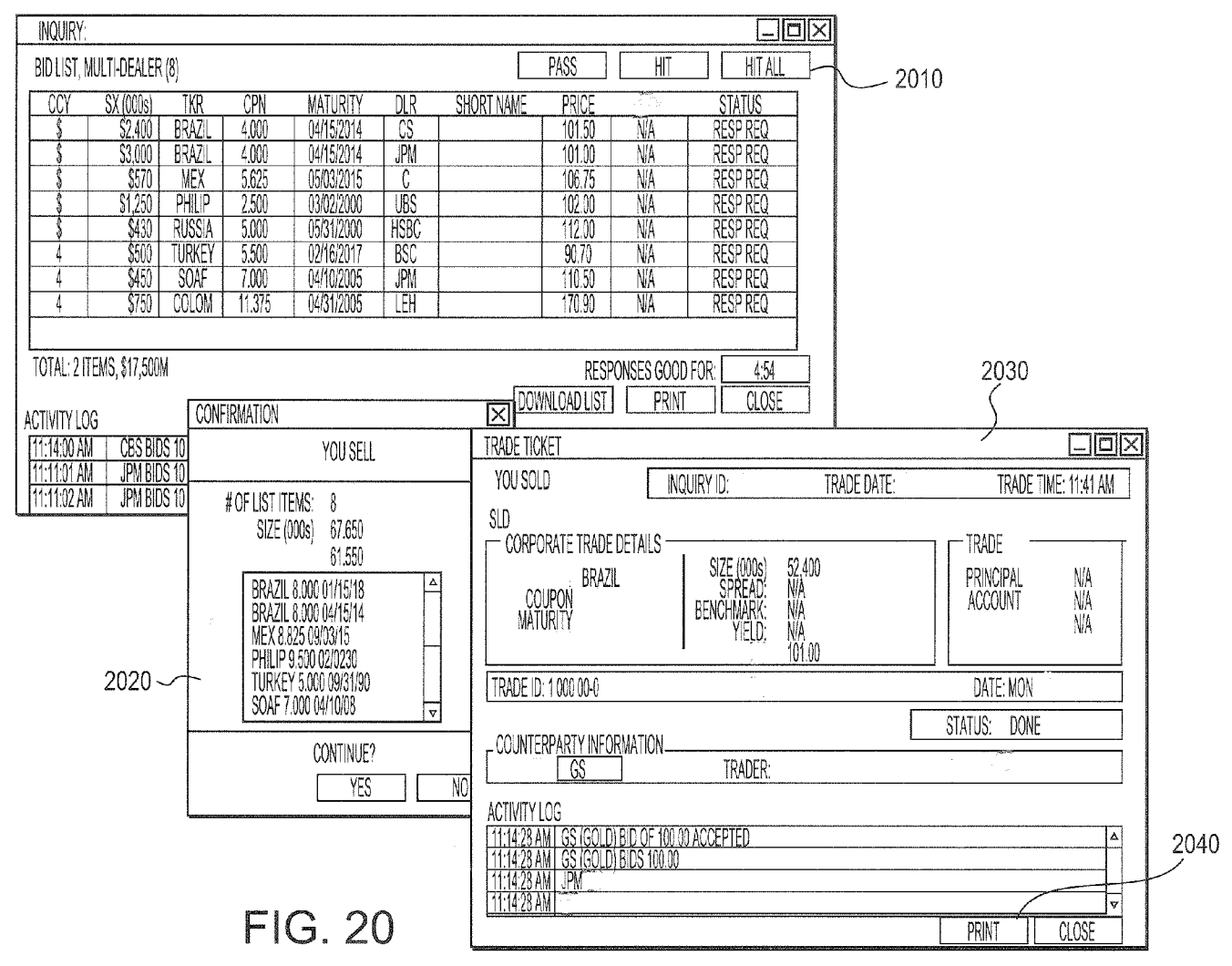

As shown in FIGS. 18, 19, and 20, the price-based inquiry list process begins with creating an inquiry list (step 1810 of FIG. 18). For example, when the list initiator selects a "Bid/Offer List" option (option 1910 of FIG. 19) from a main view or any other suitable screen, the list initiator is presented with an inquiry list edit screen. Using the inquiry list edit screen or any other suitable screen, the list initiator may create a new price-based inquiry list, modify a list that was previously sent, modify a list that was previously created but not sent, etc.

In some embodiments, the list initiator may select a particular type of list (option 1920 of FIG. 19). For example, as shown in FIG. 19, the list initiator has selected the list type "Emerging Mkts (Price)," which is a price-based list for emerging markets. Alternatively, a particular list type may be set within the list initiator's preferences or a default list type may be automatically selected.

The list initiator may input item into the price-based inquiry list (step 1820 of FIG. 18). For example, the user may select items from an instrument database provided by the system, select items from his uploaded portfolios, input a ticker in a ticker field of the inquiry list, input an ISIN number in an identifier field of the inquiry list, etc. (item 1930 of FIG. 19). For each item on the inquiry list, the list initiator may also enter any other suitable information, such as the size or the amount that the list initiator would like to transact. It should be noted that, in some embodiments, the list initiator may be required to input certain information like size prior to submitting the price-based list. For example, the system may prevent the list initiator from submitting the list (e.g., disabling the "Submit" button) until certain information is inputted by the list initiator (e.g., ticker, size, etc.).

The list initiator may also, using the display, select a "due in" time and a "good for" time (step 1830 of FIG. 18). For example, the list initiator may select a "due in" time of three minutes, and a "good for" time of one minute within the inquiry list display (options 1940 of FIG. 19). Responses from recipients of the inquiry list are sent to the list initiator during the response due in time. While the list initiator may see the number of respondents or recipients, the one or more responses from one or more of the respondents are placed in a "holding bin" and are not released or visible to the list initiator until the due in time has expired.

The list initiator may select to transmit the price-based inquiry list to one or more dealers (step 1840 of FIG. 18) (dealer options 1950 of FIG. 19). Again, instead of relying on a central broker to maintain the anonymity of the buyer and seller, the preferred embodiments of the invention use a model where the potential counterparties (the list initiator and the dealer recipients) have an established relationship. All inquiry list negotiations and trades are done without intermediation of a third party. The buyer and seller of each instrument or item are fully known to each other throughout the trading process.

In response to, for example, creating the price-based inquiry list, selecting one or more dealers to transmit the list, and select "due in" time and "good for" time parameters, the list initiator may submit the list by selecting a "Submit" button (button 1960 of FIG. 19). In response to submitting the inquiry list, the price-based inquiry list is transmitted to the selected dealers (step 1850 of FIG. 18).

In some embodiments, the list initiator may be provided with a confirmation screen (screen 1970) to confirm the submission of the price-based inquiry list.

Dealers that receive the list may be alerted that a list has been received. When the recipient opens the list, that recipient may submit one or more responses to one or more of the items on the price-based inquiry list. Responses are then sent to the list initiator during the response due in time. The list initiator can see the number of respondents, but all responses are kept in a "holding bin" and are not released or visible to the list initiator until the due in time has expired.

In some embodiments, an indicator, such as an alert or a reminder, may be provided to each respondent (or list recipient) to inform the respondent that the prices (responses) inputted in response to one or more items on the list will be released to the list initiator at a given time and that the respondent has an opportunity to review the list and the inputted prices. An alert or any other suitable indicator may be provided to each respondent at a given time prior to the expiration of the "due in" timer (e.g., one minute, five minutes, thirty seconds, or any other suitable time). For example, a respondent may be provided with an alert one minute prior to the "due in" timer expiring. The alert may inform the respondent that, for example, the one or more responses and prices inputted by the respondent will be released to the list initiator upon the expiration of the "due in" timer.

In some embodiments, the alert may also prompt the respondent with questions, such as "Do you want to review the list?" The alert may provide the user with a suitable interface, such as "Yes" and "No" buttons. In response to the respondent selecting the "Yes" button, the respondent may be provided with a list response screen or any other suitable display that allows the respondent to review the inputted responses (e.g., prices) and allow the respondent to adjust the responses. Alternatively, if the respondent selects the "No" button, the alert may terminate or close.

When the "due in" time expires, the process enters the list trade state. In the list trade state, the "good for" timer begins to count down and responses to items on the inquiry list are presented to the list initiator and the list initiator is provided with the opportunity to execute trades on one or more of the received responses (step 1860 of FIG. 18). The list initiator may pass (elect to not trade) on one or more of the responses. The list initiator may execute trades by "hitting" or "lifting" the responses submitted. The list initiator may perform this in rapid succession until the list initiator has acted on all the items or until the "good for" time has expired. For example, the list initiator may be presented with the "best" response or "best" price to each item on the inquiry list. The prices provided in the responses from the respondents are the prices that the trades are executed. Accordingly, the items that are traded (by hitting or lifting) advance to "Done" or list complete state.

In some embodiments, the price may be calculated by the trading system. For example, because the list initiator and the respondent have an established relationship, the list initiator and the respondent may have a history of trades executed between them. When a price has not been indicated by the respondent in the list response, the trading system may use the last price transacted on between the list initiator and the respondent.

Alternatively, the list initiator may send a request to the respondent inquiring as to whether the respondent is interested in executing a trade for an item at the same price as done in the past (e.g., same as last time). The list initiator may be provided with a historical price-based list, where the initiator inputs the item for trading and selects dealers that the list initiator has traded with in the past. In response to a respondent accepting the request, the trading system may determine the last price (e.g., from a database, etc.).

In some embodiments, the list initiator may be provided with a "hit all" button or user interface (button 2010 of FIG. 20) that allows the list initiator to accept all of the dealer responses instead of executing a trade with each list item individually. Alternatively, the list initiator may select a "Hit" or "Lift" button for each item on the inquiry list.

In some embodiments, the list initiator may be provided with the opportunity to review the items being executed (step 1870 of FIG. 18). For example, the list initiator may be provided with a confirmation screen (screen 2020 of FIG. 20). The confirmation screen may provide the user with an opportunity to review the items being executed. For example, the confirmation screen may allow the user to view the prices in a particular currency (e.g., U.S. Dollars, Euros, etc.). In another example, items on the inquiry list may be traded in different currencies and the confirmation screen may allow the user to view each price and/or the total price of the items being executed in a selected currency.

In response to executing the trades and/or confirming the trades, the list initiator may be provided with a trading ticket or any other suitable display indicating that the trade(s) have been completed (step 1880 of FIG. 18). For example, the list initiator may be provided with a trading ticket (screen 2040 of FIG. 20). The trading ticket may provide the list initiator with a summary of the transaction and/or details of the trade. Additional information may also be included on the trading ticket (e.g., status, settlement date, trader name, salesperson name, dealer name, trade identification number, issuer, coupon, maturity, ISIN number, size, price, etc.).

Accordingly, systems and methods for creating, submitting, and trading price-based inquiry lists are provided.

It will also be understood that the detailed description herein may be presented in terms of program procedures executed on a computer (e.g., an endpoint) or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

The system according to the invention may include a general purpose computer, or a specially programmed special purpose computer. The user may interact with the system via e.g., a personal computer or over PDA, e.g., the Internet an Intranet, etc. Either of these may be implemented as a distributed computer system rather than a single computer. Similarly, the communications link may be a dedicated link, a modem over a POTS line, the Internet and/or any other method of communicating between computers and/or users. Moreover, the processing could be controlled by a software program on one or more computer systems or processors, or could even be partially or wholly implemented in hardware.

Although a single computer (e.g., an endpoint) may be used, the system according to one or more embodiments of the invention is optionally suitably equipped with a multitude or combination of processors or storage devices. For example, the computer may be replaced by, or combined with, any suitable processing system operative in accordance with the concepts of embodiments of the present invention, including sophisticated calculators, hand held, laptop/notebook, mini, mainframe and super computers, as well as processing system network combinations of the same. Further, portions of the system may be provided in any appropriate electronic format, including, for example, provided over a communication line as electronic signals, provided on CD and/or DVD, provided on optical disk memory, etc.

Any presently available or future developed computer software language and/or hardware components can be employed in such embodiments of the present invention. For example, at least some of the functionality mentioned above could be implemented using Visual Basic, C, C++ or any assembly language appropriate in view of the processor being used. It could also be written in an object oriented and/or interpretive environment such as Java and transported to multiple destinations to various users.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow.

What is claimed is:

1. A computer-implemented method of price-based trading of financial instruments, the method comprising:
   displaying a list creation display that allows an initiator to enter a price-based inquiry list of financial instruments of buying or selling interest, wherein each financial instrument on the price-based inquiry list has an associated volume;
   transmitting the price-based inquiry list to a plurality of dealers;
   displaying a list response display that allows each of the plurality of dealers to enter at least one offer or bid on at least one financial instrument on the price-based inquiry list;
   starting an initiator-selected time period for receiving the at least one offer or bid for financial instruments on the price-based inquiry list from each of the plurality of dealers;
   in response to receiving two or more offers or bids for the at least one financial instrument on the price-based inquiry list, selecting a response for each financial instrument on the price-based inquiry list from the two or more offers or bids;
   holding the selected response for each financial instrument on the price-based inquiry list from being displayed to the initiator until the initiator-selected time period has elapsed;
   in response to the initiator-selected time period elapsing, displaying the selected response and an associated price for each financial instrument on the price-based inquiry list to the initiator, wherein the associated price for each financial instrument on the price-based inquiry list is automatically calculated based on the selected response; and
   in response to receiving one or more responses from the initiator on the selected response and the associated price for each financial instrument on the price-based inquiry list, transmitting a notification to the initiator and the plurality of dealers indicating whether each financial instrument on the price-based inquiry list was traded.

2. The method of claim 1, wherein the selected response is a best response, and wherein the best response is determined by sorting the two or more offers or bids for the at least one financial instrument and selecting a highest response from the two or more offers or bids.

3. The method of claim 1, further comprising displaying a subject display that allows the initiator to request a repeat from the one or more dealers that previously provided the selected response for each financial instrument on the price-based inquiry list.

4. The method of claim 2, further comprising:
   receiving a dealer response to the request for repeat from a dealer that provided the selected response for a particular financial instrument on the price-based inquiry list, wherein the dealer response indicates that the dealer accepts the request for repeat;
   automatically trading the particular financial instrument at the selected response; and
   transmitting a notification to the initiator and the dealer regarding the trade.

5. The method of claim 2, further comprising:
   receiving a dealer response to the request for repeat from a dealer that provided the selected response for a particular financial instrument on the price-based inquiry list, wherein the dealer response indicates that the dealer declines the request for repeat; and
   inhibiting the initiator from submitting additional request for repeats for that financial instrument on the price-based inquiry list.

6. The method of claim 1, further comprising transmitting a notification to a dealer that provided the selected response that indicates the initiator remains interested in executing a trade on that financial instrument after the initiator-selected timer has elapsed.

7. The method of claim 6, further comprising inhibiting the initiator and the dealer from negotiating on that financial instrument.

8. The method of claim 1, further comprising allowing the initiator to select a dealer for requesting a repeat in response to two or more of the plurality of dealers being tied for providing the selected response.

9. The method of claim 1, further comprising:
   starting a subject state timer; and
   allowing an initiator to transmit a request for a repeat from the one or more dealers that previously provided the selected response for each financial instrument on the price-based inquiry list when the subject state timer has not expired.

10. The method of claim 1, further comprising transmitting an alert to the plurality of dealers indicating that the initiator-selected timer is about to expire.

11. The method of claim 1, further comprising:
   in response to receiving a response from a dealer, wherein the response does not include a price; and retrieving the price from a past transaction between the initiator and the dealer.

12. The method of claim 1, further comprising:
retrieving previous transactions between the initiator and the plurality of dealers; and
transmitting a request to one of the plurality of dealers to execute a trade for a financial instrument at the same price from the previous transactions.

13. The method of claim 1, further comprising inputting financial instrument data for each financial instrument, wherein financial instrument data comprises at least one of: a financial instrument identifier, a currency, and a ticker.

14. The method of claim 13, further comprising:
receiving, from the initiator, at least one of: a financial instrument identifier and a ticker; and
searching through a database of financial instrument data to populate the financial instrument data that has not been inputted by the initiator.

15. The method of claim 1, further comprising verifying that an established relationship exists between the initiator and each of the plurality of dealers.

16. A system for price-based trading of financial instruments, the system comprising:
at least one processor that is configured to:
display a list creation display that allows an initiator to enter a price-based inquiry list of financial instruments of buying or selling interest, wherein each financial instrument on the price-based inquiry list has an associated volume;
transmit the price-based inquiry list to a plurality of dealers;
display a list response display that allows each of the plurality of dealers to enter at least one offer or bid on at least one financial instrument on the price-based inquiry list;
start an initiator-selected time period for receiving the at least one offer or bid for financial instruments on the price-based inquiry list from each of the plurality of dealers;
in response to receiving two or more offers or bids for the at least one financial instrument on the price-based inquiry list, select a response for each financial instrument on the price-based inquiry list from the two or more offers or bids;
hold the selected response for each financial instrument on the price-based inquiry list from being displayed to the initiator until the initiator-selected time period has elapsed;
in response to the initiator-selected time period elapsing, display the selected response and an associated price for each financial instrument on the price-based inquiry list to the initiator, wherein the associated price for each financial instrument on the price-based inquiry list is automatically calculated based on the selected response; and
in response to receiving one or more responses from the initiator on the selected response and the associated price for each financial instrument on the price-based inquiry list, transmit a notification to the initiator and the plurality of dealers indicating whether each financial instrument on the price-based inquiry list was traded.

17. A computer-implemented method of price-based trading of financial instruments, the method comprising:
displaying a list creation display that allows an initiator to enter a price-based inquiry list of financial instruments of buying or selling interest, wherein each financial instrument on the price-based inquiry list has an associated volume;
transmitting the price-based inquiry list to a plurality of dealers;
receiving and managing responses on one or more of the financial instruments on the price-based inquiry list from the plurality of dealers, wherein the responses are collected for a predetermined time period and wherein, for each financial instrument on the price-based inquiry list, a response is selected from the received responses;
automatically calculating, for each financial instrument on the price-based inquiry list, a final price based at least in part on the selected responses received from the plurality of dealers;
in response to the predetermined time period elapsing, transmitting the selected response for each financial instrument from the plurality of dealers to the initiator that includes at least the final price for each financial instrument on the price-based inquiry list;
receiving a response from the initiator to trade one or more financial instrument on the price-based inquiry list at the selected response; and
transmitting a notification to the initiator and the plurality of dealers indicating whether each financial instrument on the price-based inquiry list was traded.

18. The method of claim 17, further comprising displaying a subject display that allows the initiator to request a repeat from the one or more dealers that previously provided the selected response for each financial instrument on the price-based inquiry list.

19. The method of claim 18, further comprising:
receiving a dealer response to the request for repeat from a dealer that provided the selected response for a particular financial instrument on the price-based inquiry list, wherein the response indicates that the dealer accepts the request for repeat;
automatically trading the particular financial instrument at the selected response; and
transmitting a notification to the initiator and the dealer regarding the trade.

20. The method of claim 18, further comprising:
receiving a dealer response to the request for repeat from a dealer that provided the selected response for a particular financial instrument on the price-based inquiry list, wherein the response indicates that the dealer declines the request for repeat; and
inhibiting the initiator from submitting additional request for repeats for that financial instrument on the price-based inquiry list.

* * * * *